(12) United States Patent
Shudarek et al.

(10) Patent No.: US 8,692,644 B2
(45) Date of Patent: Apr. 8, 2014

(54) HARMONIC MITIGATION DEVICES AND APPLICATIONS THEREOF

(75) Inventors: Todd Shudarek, West Bend, WI (US); Wayne Walcott, Hartland, WI (US); Wesley Ruther, Fredonia, WI (US)

(73) Assignee: MTE Corporation, Menomonee Falls, WI (US)

( * ) Notice: Subject to any disclaimer, the term of this patent is extended or adjusted under 35 U.S.C. 154(b) by 0 days.

(21) Appl. No.: 13/357,476

(22) Filed: Jan. 24, 2012

(65) Prior Publication Data

US 2012/0256719 A1    Oct. 11, 2012

Related U.S. Application Data

(60) Provisional application No. 61/435,520, filed on Jan. 24, 2011, provisional application No. 61/450,693, filed on Mar. 9, 2011.

(51) Int. Cl.
   *H01F 27/24*    (2006.01)
(52) U.S. Cl.
   USPC .......................................................... 336/212
(58) Field of Classification Search
   USPC .................................. 336/212, 200, 232, 178
   See application file for complete search history.

(56) References Cited

U.S. PATENT DOCUMENTS

| | | | | |
|---|---|---|---|---|
| 3,659,191 | A * | 4/1972 | Spreadbury | 323/248 |
| 5,774,311 | A | 6/1998 | Gooch | |
| 2004/0080978 | A1 | 4/2004 | Jitaru | |
| 2006/0250207 | A1* | 11/2006 | Shudarek | 336/212 |
| 2009/0295524 | A1 | 12/2009 | Silva | |

FOREIGN PATENT DOCUMENTS

JP    11-224817 A    8/1999

OTHER PUBLICATIONS

International Search Report and Written Opinion issued in International Application No. PCT/US2012/02245 dated Sep. 27, 2012.

* cited by examiner

*Primary Examiner* — Tuyen Nguyen
(74) *Attorney, Agent, or Firm* — Greenberg Traurig, LLP

(57) ABSTRACT

In one embodiment, the instant invention can provide an inductor that at least includes the following component(s): at least one FAP positioned along at least one magnetic flux path; where the at least one FAP is a high permeability core gap piece; and where the at least one FAP has an effective magnetic permeability that varies based on at least in part on one of the following factors: i) at least one magnetic flux through the at least one FAP, and ii) sufficient heating of the at least one FAP.

14 Claims, 44 Drawing Sheets

| Property | Unit | Symbol | Value |
|---|---|---|---|
| Initial Permeability @ B < 10 gauss | | $\mu_i$ | 2000 |
| Flux Density @ Field Strength | gauss oersted | B H | 4900 5 |
| Residual Flux Density | gauss | $B_r$ | 1800 |
| Coercive Force | oersted | $H_c$ | 0.30 |
| Loss Factor @ Frequency | $10^{-6}$ MHz | $\tan\delta\mu_i$ | 15 0.1 |
| Temperature Coefficient of Initial Permeability (20 -70°C) | %/°C | | 0.7 |
| Curie Temperature | °C | $T_c$ | >200 |
| Resistivity | Ω cm | ρ | $1\times10^2$ |

*FIG. 13A*

| Property | Unit | Symbol | 68 | 67 | 61 | 52 | 51 | 44 |
|---|---|---|---|---|---|---|---|---|
| Initial Permeability @ B <10 gauss | | μ | 16 | 40 | 125 | 250 | 350 | 500 |
| Flux Density @ Field Strength | gauss / mT / oersted / A/m | B / H | 2700 / 270 / 40 / 3200 | 2300 / 230 / 20 / 1600 | 2350 / 235 / 15 / 1200 | 4200 / 420 / 10 / 800 | 3200 / 320 / 10 / 800 | 3000 / 300 / 10 / 800 |
| Residual Flux Density | gauss / mT | Br | 1000 / 100 | 800 / 80 | 1200 / 120 | 2900 / 290 | 1200 / 120 | 1100 / 110 |
| Coercive Force | oersted / A/m | Hc | 7.0 / 560 | 3.5 / 280 | 1.8 / 144 | 0.6 / 48 | 0.6 / 48 | 0.45 / 36 |
| Loss Factor @ Frequency | $10^{-6}$ / MHz | tan δ/μ | 500 / 100 | 150 / 50 | 30 / 1.0 | 45 / 1.0 | 40 / 1.0 | 125 / 1.0 |
| Temperature Coefficient of Initial Permeability (20-70°C) | %/°C | | 0.10 | 0.05 | 0.10 | 1.0 | 0.8 | 0.75 |
| Curie Temperature | °C | Tc | >500 | >475 | >300 | >250 | >170 | >160 |
| Resistivity | Ω·cm | ρ | 1x10⁷ | 1x10⁷ | 1x10⁸ | 1x10⁸ | 1x10⁹ | 1x10⁹ |
| Power Loss Density 25kHz - 2000 G - 100°C 100kHz - 1000 G - 100°C 500kHz - 500 G - 100°C | mW/cm³ | P | --- | --- | --- | --- | --- | --- |
| Recommended Frequency Range | MHz | | <400 | <200 | <100 | <20 | >300 | 25 - 300 |
| Application Areas: Low flux density devices, EMI suppression, Power magnetics, Special square loop ferrite | | | | | 200 - 2000 | 200 - 1000 | | |
| See this page for additional material data | | | 7 | 8 | 9 | 10 | 11 | 12 |

*FIG. 14A*

| 46 | 33 | 65 | 43 | 79 | 31 | 77 | 78 | 73 | 75 | 76 |
|---|---|---|---|---|---|---|---|---|---|---|
| 500 | 600 | 600 | 800 | 1400 | 1500 | 2000 | 2300 | 2500 | 5000 | 10000 |
| 3000<br>300<br>10<br>800 | 2800<br>280<br>5<br>400 | 4200<br>420<br>10<br>800 | 2800<br>290<br>10<br>800 | 4700<br>470<br>5<br>400 | 3400<br>340<br>5<br>400 | 4800<br>480<br>5<br>420 | 4800<br>480<br>5<br>400 | 3900<br>390<br>5<br>400 | 4300<br>430<br>5<br>400 | 4000<br>400<br>5<br>400 |
| 1900<br>190 | 1200<br>120 | 3700<br>370 | 1300<br>130 | 1700<br>170 | 2500<br>250 | 1800<br>180 | 1500<br>150 | 1500<br>150 | 1400<br>140 | 1800<br>180 |
| 0.40<br>32 | 0.60<br>48 | 0.50<br>40 | 0.45<br>36 | 0.40<br>32 | 0.35<br>28 | 0.30<br>24 | 0.20<br>16 | 0.24<br>19.2 | 0.16<br>13 | 0.12<br>9.6 |
| 60<br>0.1 | 25<br>0.2 | 30<br>0.1 | 250<br>1.0 | 4.0<br>0.1 | 20<br>0.1 | 15<br>0.1 | 4.5<br>0.1 | 10<br>0.1 | 15<br>0.1 | 15<br>0.025 |
| --- | 0.10 | --- | 1.25 | 0.6 | 1.6 | 0.7 | 1.0 | 0.65 | 0.6 | 0.5 |
| >140 | >150 | >200 | >130 | >225 | >130 | >200 | >200 | >160 | >140 | >120 |
| $1 \times 10^5$ | $1 \times 10^5$ | $2 \times 10^5$ | $1 \times 10^5$ | $2 \times 10^5$ | $3 \times 10^5$ | $1 \times 10^5$ | $2 \times 10^5$ | $1 \times 10^5$ | $3 \times 10^5$ | 50 |
| ---<br>--- | ---<br>--- | ---<br>--- | ---<br>--- | ---<br>80 | ---<br>--- | 200<br>--- | 75<br>85 | ---<br>--- | 140<br>--- | ---<br>--- |
| ---<br>25 - 300<br>---<br>--- | <3<br>---<br>---<br>--- | ---<br>---<br>---<br><0.15 | <10<br>25 - 300<br>---<br>--- | ---<br>---<br><0.75<br>--- | ---<br>1 - 200<br>---<br>--- | <3<br>---<br>---<br>--- | <2.5<br>---<br><0.5<br>--- | ---<br><50<br>---<br>--- | <0.75<br>---<br><0.1<br>--- | <0.5<br>---<br>---<br>--- |
| 13 | 14 | 15 | 16 | 18/19 | 17 | 20/21 | 22/23 | 24 | 25 | 26 |

*FIG. 14B*

| h | 3 % reactance | 5% reactance | 8% impedance 3% dc choke & 5% ac reactor |
|---|---|---|---|
| 5th | 39% | 32% | 27% |
| 7th | 17% | 12% | 9% |
| 11th | 7% | 5.8% | 4.5% |
| 13th | 5% | 3.9% | 3.2% |
| 17th | 3% | 2.2% | 1.8% |
| 19th | 2.2% | 1.7% | 1.4% |
| 23rd | 1.5% | 1% | 0.8% |
| 25th | 1% | 0.9% | 0.75% |
| THID | 44% | 35% | 29% |

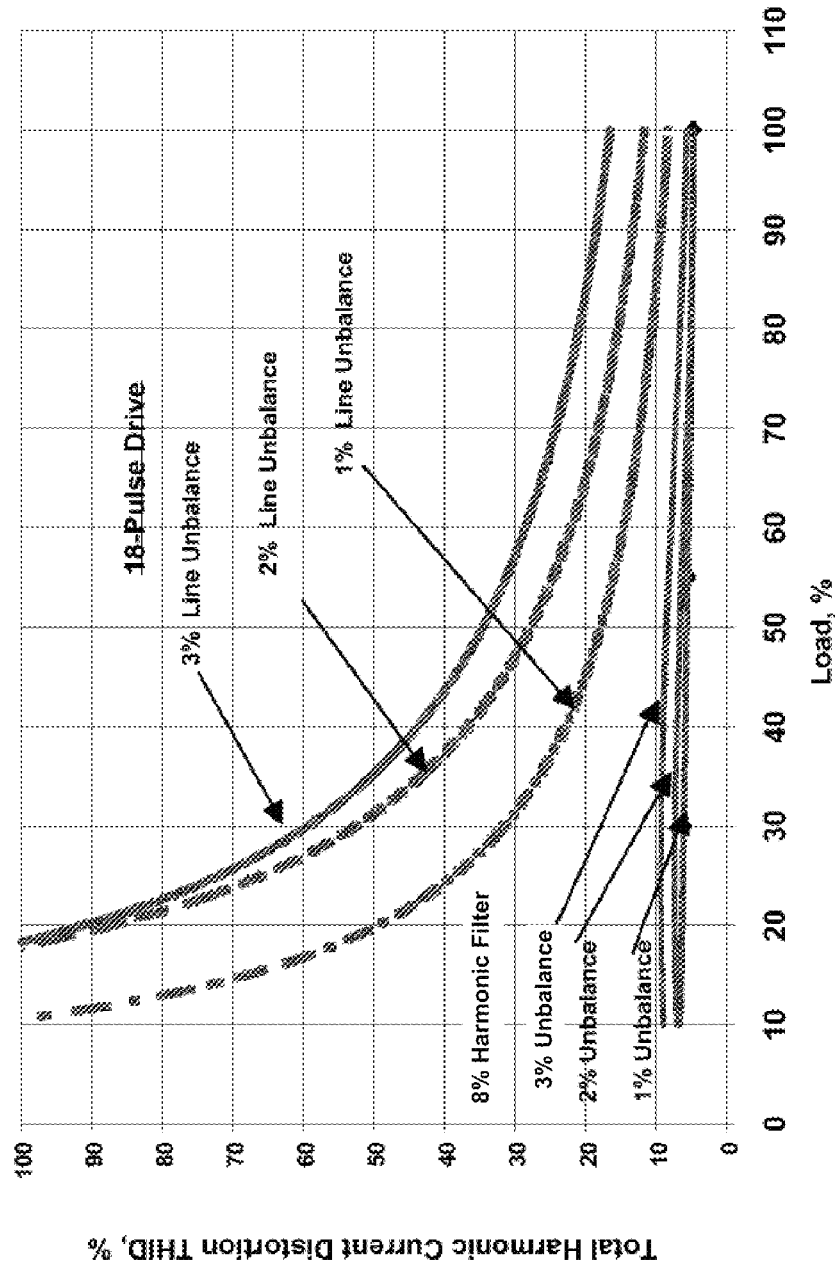
FIG. 39  18 Pulse Drive vs. 6-pulse VFD with Harmonic Filter

HARMONIC MITIGATION DEVICES AND APPLICATIONS THEREOF

RELATED APPLICATIONS

This application claims the priority of provisional application Ser. No. 61/435,520, filed Jan. 24, 2011, entitled "METHODS AND SYSTEMS FOR ADAPTIVE PASSIVE HARMONIC MITIGATION DEVICE," and Ser. No. 61/450,693, filed Mar. 9, 2011, entitled "METHODS AND SYSTEMS FOR ADAPTIVE PASSIVE HARMONIC MITIGATION DEVICE," which are incorporated herein by reference in their entirety for all purposes.

TECHNICAL FIELD

In some embodiments, the instant invention relates to current filters and/or inductors applications thereof.

BACKGROUND

Electrical distribution systems, for example in a building or industrial facility, typically supply electricity to non-linear loads, such as adjustable speed motor drives, uninterruptible power supplies (UPS), battery chargers, servo drives, and welders. These loads produce various levels of current at harmonic frequencies in the power distribution system with the harmonic spectrum depending upon the nature of the load. Typically, variable frequency drives can experience substantial harmonic distortion caused by non-linear loads. Typically, magnitude of harmonic currents in an individual non-linear load depends on the total effective input reactance, which can be a product of a source reactance plus added line reactance.

SUMMARY OF INVENTION

In some embodiments, the instant invention can provide an inductor that at least includes the following component(s): at least one FAP positioned along at least one magnetic flux path; where the at least one FAP is a high permeability core gap piece; and where the at least one FAP has an effective magnetic permeability that varies based on at least in part on one of the following factors: i) at least one magnetic flux through the at least one FAP, and ii) sufficient heating of the at least one FAP.

In some embodiments, where the sufficient heating is to Curie temperature of the at least one FAP.

In some embodiments, where the inductor further comprises at least one MAP, wherein the at least one MAP is a metallic gap piece, wherein the at least one MAP is located in sufficient proximity to the at least one FAP hereby resulting in the sufficient heating by at least one MAP of the at least one FAP.

In some embodiments, where the inductor further comprises at least one insulator, wherein the at least one insulator is positioned along the at least one magnetic flux part hereby further adjusting an inductance of the inductor.

In some embodiments, where the at least one FAP comprises at least one ferrite material.

In some embodiments, where the at least one soft ferrite material is selected from a group consisted of Nickel-Zinc ferrite material, Magnesium-Zinc ferrite material, and Manganese-Zinc ferrite material.

In some embodiments, where the at least one FAP comprises at least one material having suitable relative permeability in a range between 14 to 550.

In some embodiments, where the at least one FAP comprises at least one molypermalloy power material.

In some embodiments, where the at least one molypermalloy power material contains at least 50 percent weight of Nickel, at least 20 percent weight of Iron, and the balance comprising another suitable material.

In some embodiments, where the Curie temperature is between about 130 and about 1200 degrees Celsius.

In some embodiments, where the Curie temperature is about 200 degrees Celsius.

In some embodiments, where the at least one FAP comprises at least one first FAP part and at least one second FAP part wherein the at least one first FAP part and the at least one second FAP part are separate structures.

In some embodiments, where the at least one first FAP part differs from the at least one second FAP part in at least one of the followings characteristics: composition, size, and shape.

In some embodiments, where the at least one first FAP part has a first shape and the at least one second FAP part has a second shape, and wherein the first shape is complementary to the second shape such that the at least one first FAP part interlocks with the at least one second FAP part to assemble the at least one FAP.

In some embodiments, where the inductor is one of the following devices: i) a passive three phase filter, ii) a passive single phase filter, iii) a harmonic filter, iv) an integrated DC link, choke, v) a three phase AC drive reactor, vi) a single phase AC drive reactor, and vii) a single phase DC reactor.

In some embodiments, where a core of the harmonic filter has a plurality of sections.

In some embodiments, where three phase AC drive reactor is a three phase AC drive input reactor.

In some embodiments, where the single phase AC drive reactor is a single phase AC drive input reactor.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

FIGS. 13A-13I illustrate certain features of some embodiments of the present invention.

FIG. 14A illustrates certain features of some embodiments of the present invention.

FIG. 14B illustrates certain features of some embodiments of the present invention.

FIG. 39 illustrates certain features of some embodiments of the present invention.

Figure 1A:
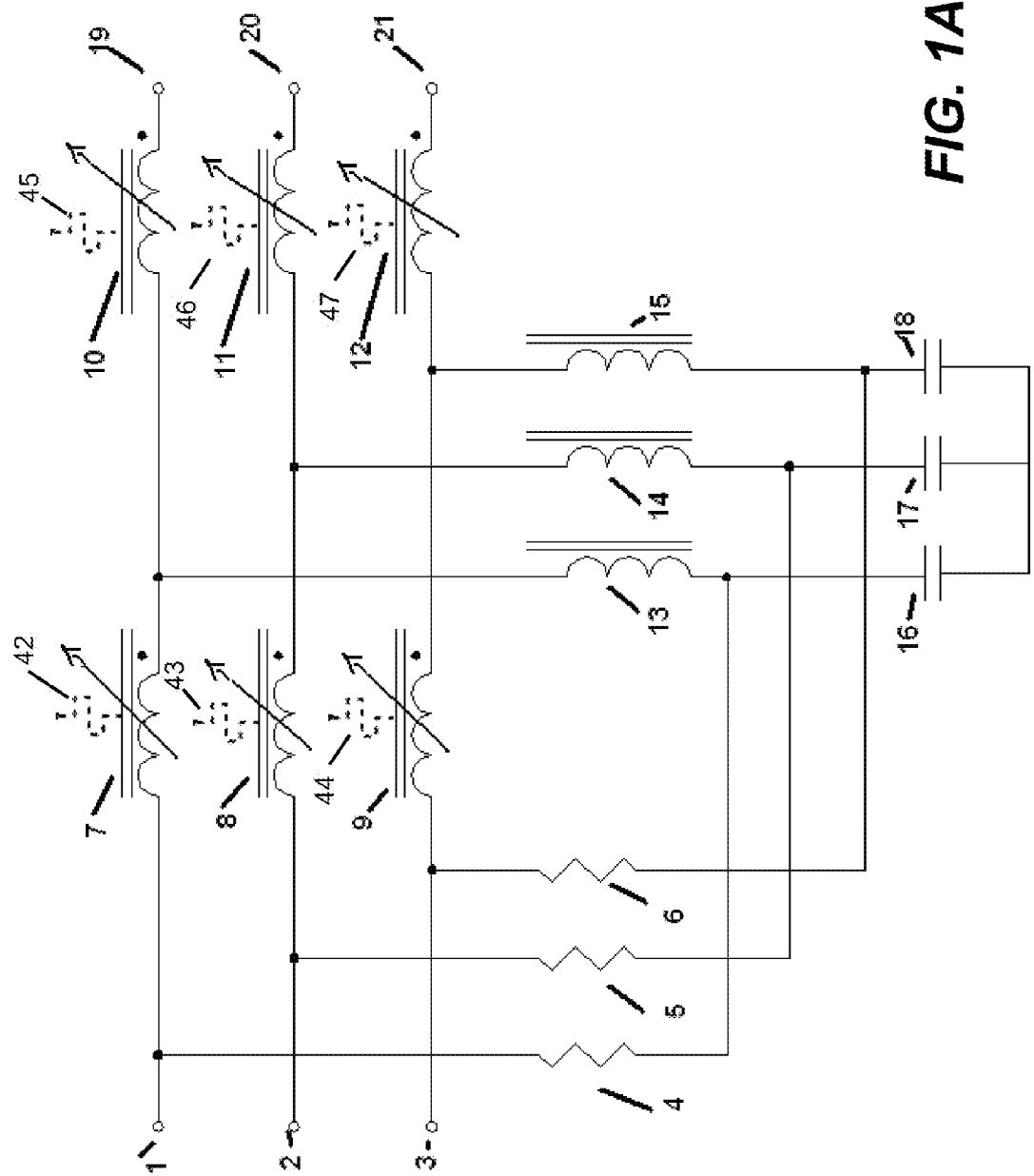
FIG. 1A illustrates certain features of some embodiments of the present invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "In some embodiments" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Further, the terms "substantial," "substantially," "similar," "similarly," "analogous", "analogously," and any combination thereof mean that differences between compared features or characteristics is less than 25% of the respective values/magnitudes in which the compared features or characteristics are measured and/or defined.

As used herein, "high permeability" means a magnetic permeability that is at least 1000 times greater than the permeability of air, and "low permeability" means a magnetic permeability that is less than 100 times the permeability of air.

In some embodiments, the instant invention can be used as a harmonic mitigating device between a power distribution system and one or more harmonic-generating loads and can result in an sufficient harmonic mitigation at full load operation. In some embodiments, the instant invention can be used as a passive harmonic mitigating device between the power distribution system and one or more harmonic-generating loads and can result in an sufficient harmonic mitigation at reduced loads. In some embodiments, the instant invention allows to improve the harmonic mitigation at full load and, at the same time, to bring the harmonic mitigation to an acceptable level at light loads, without resulting in filter's increased physical size, complexity and/or cost.

In some embodiments of the instant invention, as shown in FIGS. 1A-C, 2A-B, 3 and 4A-B, there are three input coils 7, 8, and 9. In some embodiments of the instant invention, these input coils provide impedance to minimize harmonic current flow and detune the shunt filtering formed by the inductances 13, 14, and 15, and the capacitances 16, 17, and 18. In some embodiments of the instant invention, the input coils 7, 8, and 9 can lower the parallel resonant frequency of the input of the filter to a power system. In some embodiments of the instant invention, the output inductances 10, 11, and 12 can smooth out the currents produced by the load.

Figure 1B:
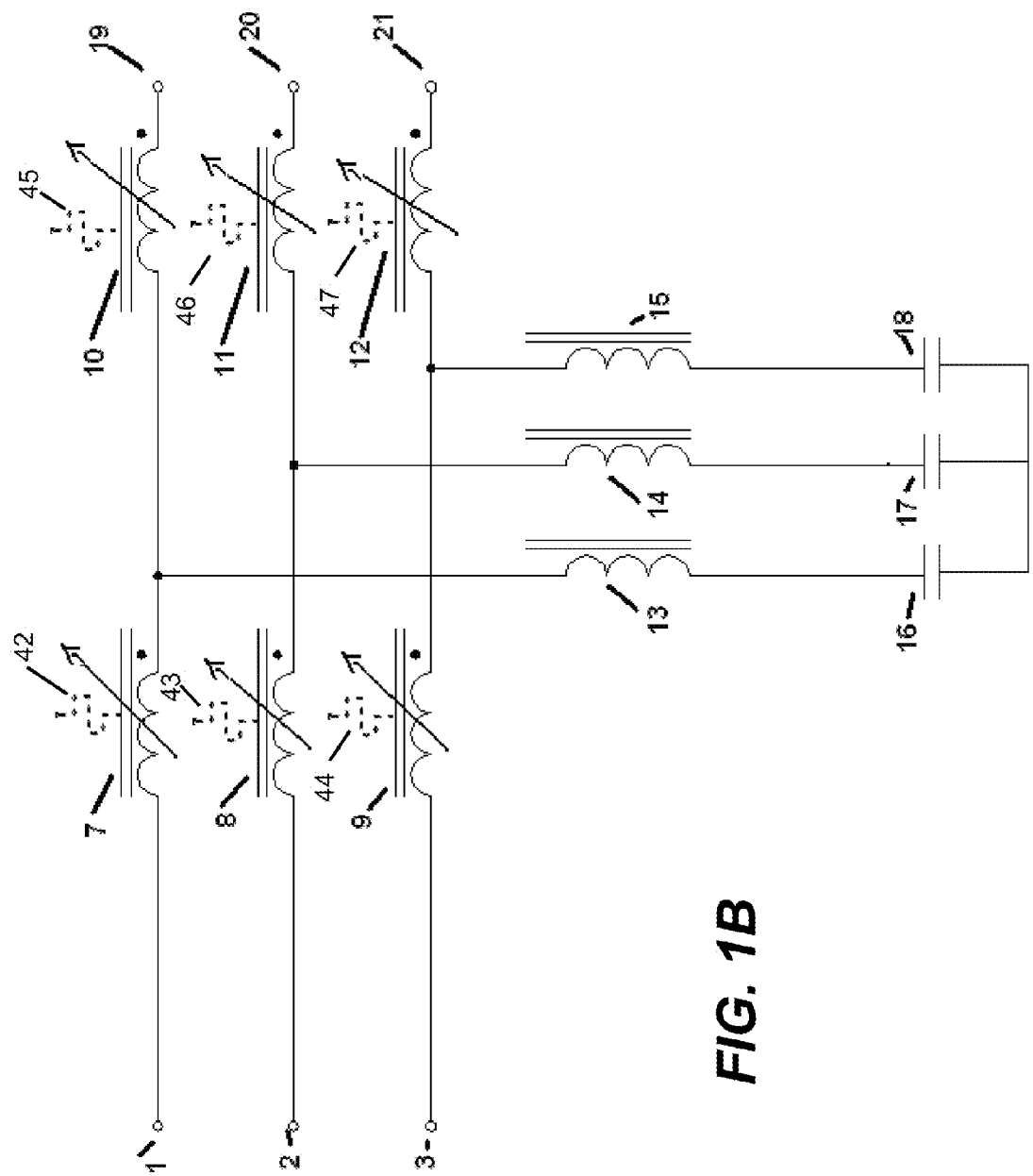
FIG. 1B illustrates certain features of some embodiments of the present invention.
Figure 1C:
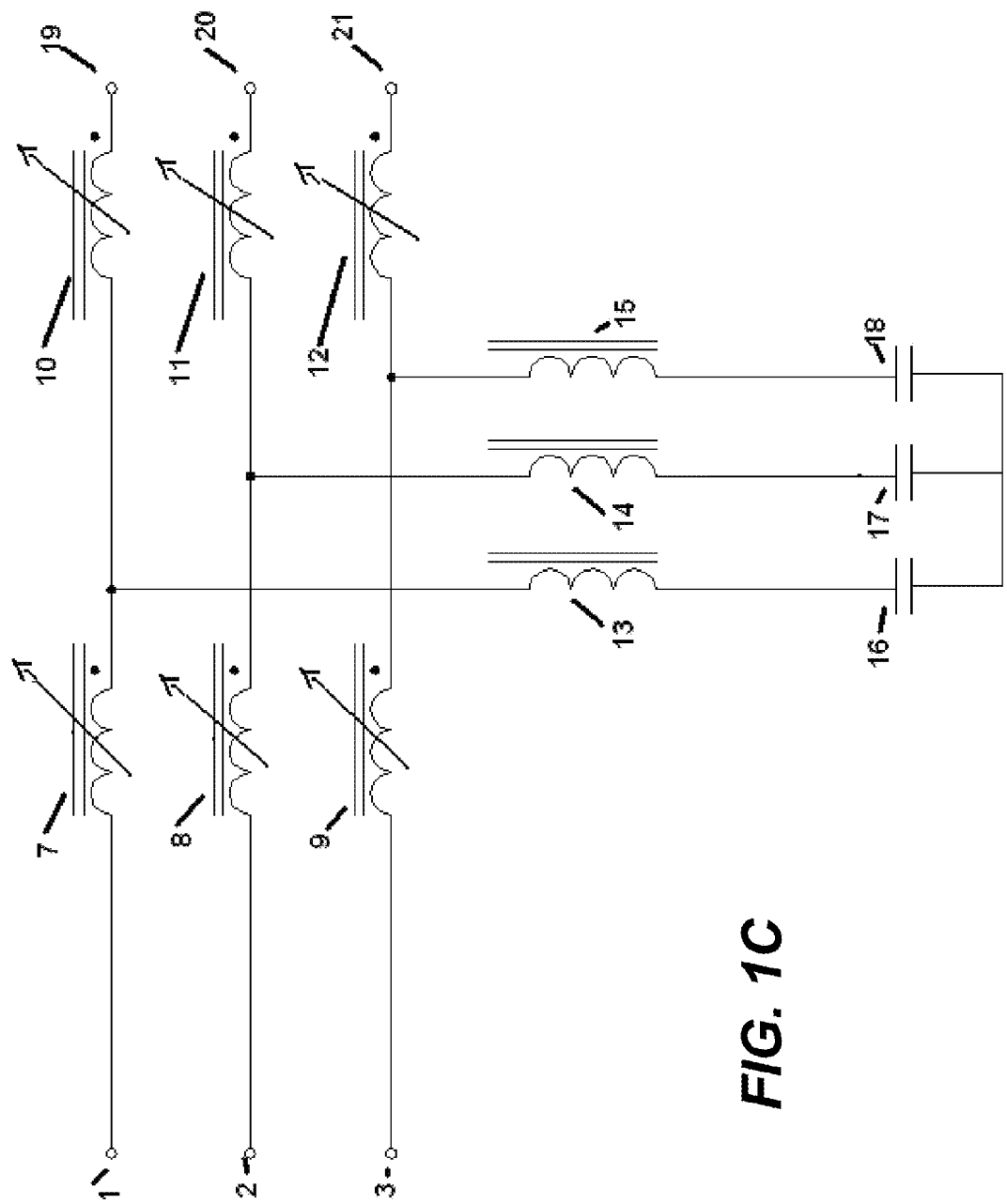
FIG. 1C illustrates certain features of some embodiments of the present invention.

In some embodiments of the instant invention, as shown in FIGS. 1A-C, there can be a shunt filter formed by inductances 13, 14, and 15, and capacitances 16, 17, and 18, and the shunt filter can be tuned to the dominant harmonic current. In some embodiments of the instant invention, as shown in FIG. 1A, there can be resistances 4, 5, and 6. In some embodiments of the instant invention, these resistances 4, 5, and 6 can be used to damp the voltage and current peaks during transients.

In some embodiments of the instant invention, the inductor core structure, other than the gap material, can be constructed in accordance with U.S. Pat. No. 7,142,081, entitled "MULTIPLE THREE-PHASE INDUCTOR WITH A COMMON CORE," whose disclosure in its entirety is incorporated herein for all purposes, specifically for construction of the inductor core.

In some embodiments, the inductor core structure of the instant invention can further contain additional high permeability core gap piece(s). In some embodiments of the instant invention, the high permeability core gap pieces are collectively called "FAPs."

In some embodiments, the FAPs can be made of composition(s) that contain ferrites. Ferrites are chemical compounds consisting of ceramic materials with iron(III) oxide ($Fe_2O_3$) as their principal component. Ferrites are usually ferrimagnetic ceramic compounds derived from iron oxides such as hematite ($Fe_2O_3$) or magnetite ($Fe_3O_4$) as well as oxides of other metals. In terms of their magnetic properties, the different ferrites are often classified as "soft" or "hard", which refers to their low or high magnetic coercivity. The low coercivity means the material's magnetization can easily reverse direction without dissipating much energy (hysteresis losses), while the soft ferrite material's high resistivity prevents eddy currents. Typically, soft ferrite has a cubic crystalline structure with the chemical formula $MO.Fe_2O_3$ where $Fe_2O_3$ is iron oxide and MO refers to divalent metal (i.e: zinc, nickel, manganese and copper) oxides in various amounts.

In some embodiments of the instant invention, the ferrite material of FAPs structures can be made from any suitable soft ferrite material and/or alloy such as, but not limiting to, Nickel-Zinc ferrite material, Magnesium-Zinc ferrite material, Manganese-Zinc ferrite material, and any other materials exhibiting desired characteristics as utilized by the instant invention. In some embodiments, for FAPs structures, the instant invention can utilize, but is not limited to, one or more suitable materials sufficiently similar to soft ferrite materials produced by Fair-Rite Products Corp. such as Manganese zinc (Fair-Rite 31, 33, 73, 75, 76, 7, 78 and 79 material), Nickel zinc (Fair-Rite 42, 43, 44, 51, 52, 61, 67 and 68 material), Manganese (Fair-Rite 85 material), and Magnesium zinc (Fair-Rite 46 material). FIGS. 14A-B provide some characteristics of Fair-Rite' ferrite materials that can be utilized for FAPs in accordance with principle(s) of the instant invention. Properties identified in FIGS. 14A-B were measured at room temperature, unless otherwise specified, using medium size toroidal cores. In some embodiments, for FAPs, the instant invention can utilize material(s) whose characteristics and behaviors are substantially analogous or similar to the characteristics identified in FIGS. 14A-B so that the selected ferrite material(s) function(s) as required in accordance with principle(s) of the instant invention.

In some embodiments of the instant invention, FAPs possess a desired Curie temperature within a range of about 100 to 150 degrees Celsius. In some embodiments of the instant invention, FAPs possess a desired Curie temperature within a range of about 140 to 160 degrees Celsius. In some embodiments of the instant invention, FAPs possess a desired Curie temperature at about 250 degrees Celsius. In some embodiments of the instant invention, FAPs possess a desired Curie temperature at about 750 degrees Celsius. In some embodiments of the instant invention, FAPs possess a desired Curie temperature at about 1000 degrees Celsius. In some embodiments of the instant invention, FAPs possess a desired Curie temperature at about 1200 degrees Celsius or higher. In some embodiments of the instant invention, FAPs possess a desired Curie temperature at about 1200 degrees Celsius or lower.

In some embodiments, any suitable ferrite material can be used to achieve adaptive passive filtering of the instant invention. For example, in some embodiments, Nickel-Zinc ferrite material can have a Curie temperature of about 140 degrees Celsius. Curie temperature is typically the temperature at which a ferromagnetic or a ferrimagnetic material typically becomes paramagnetic on heating; the effect is reversible. Typically, a magnet would lose its magnetism if heated above the Curie temperature. In one example, Nickel-Zinc ferrite material is typically used as complete cores on components operating at 1 MHz or more.

Figure 12:
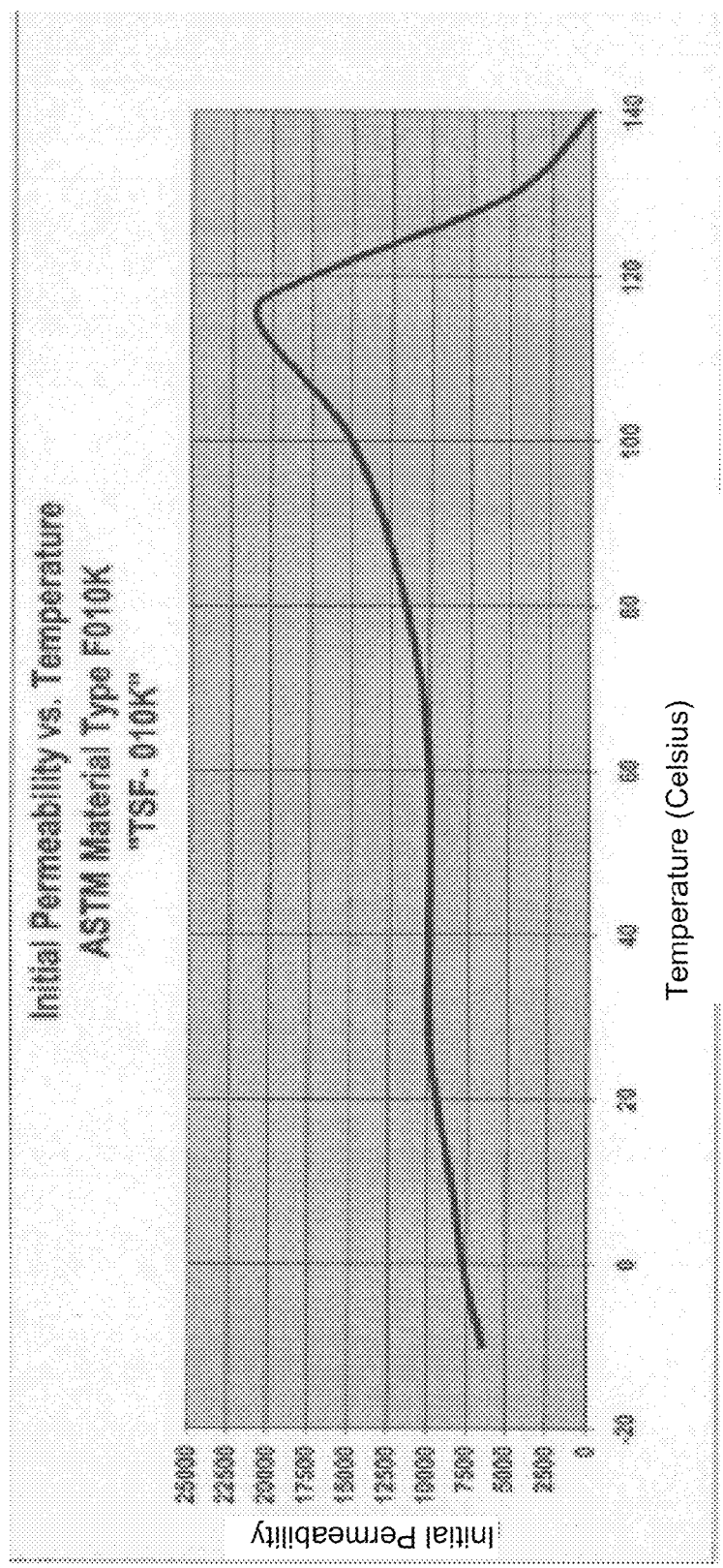
FIG. 12 illustrates certain features of some embodiments of the present invention.

In some embodiments, the instant invention can utilize TSC Ferrite International F010K material for FAPs. FIG. 12 illustrates the magnetic permeability characteristics of typical TSC Ferrite International F010K material versus temperature. The typical TSC Ferrite International F010K material becomes nearly non-magnetic at about 140 degrees Celsius.

Figures 13B, 13C:
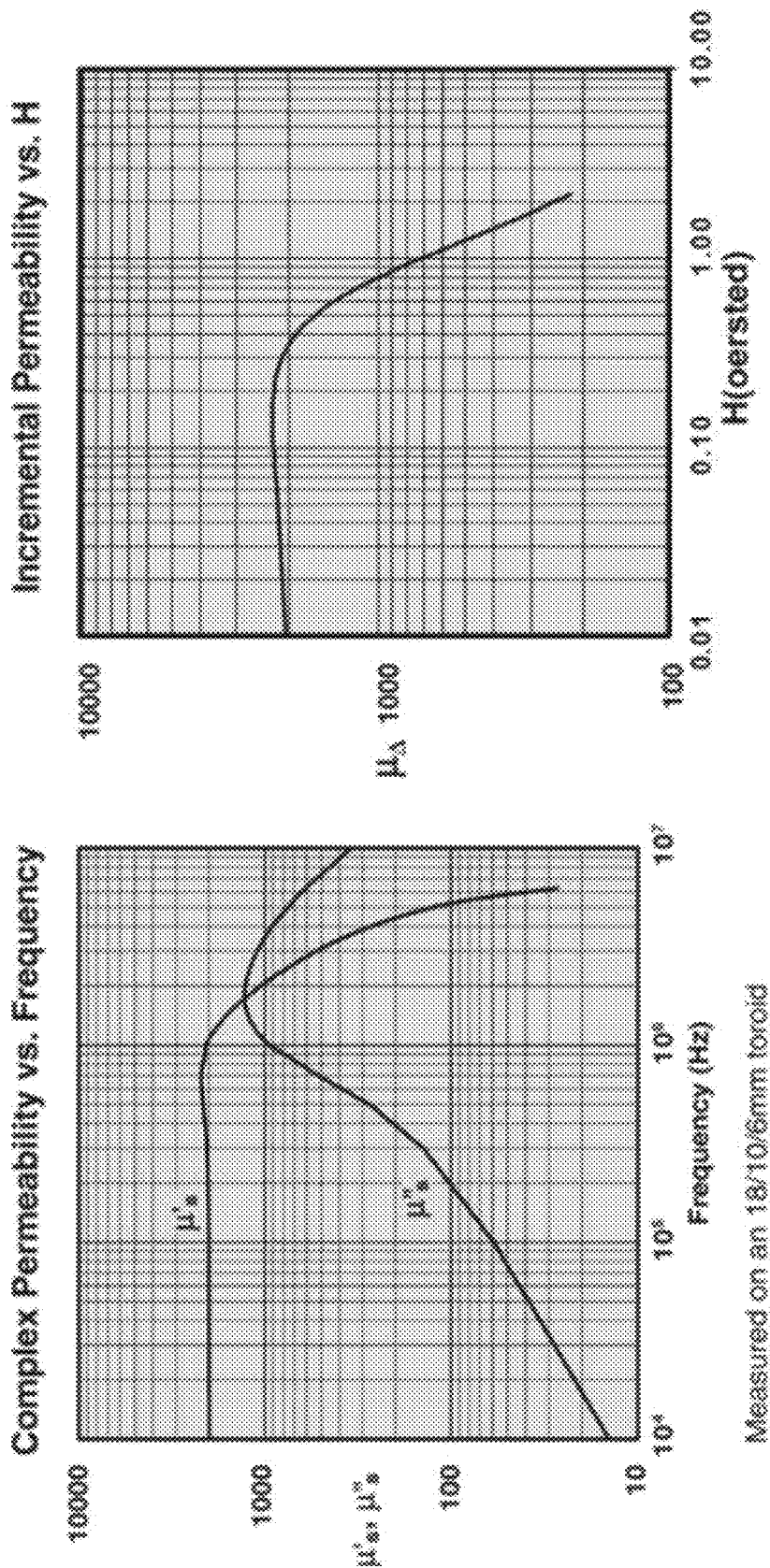
Figure 13E:
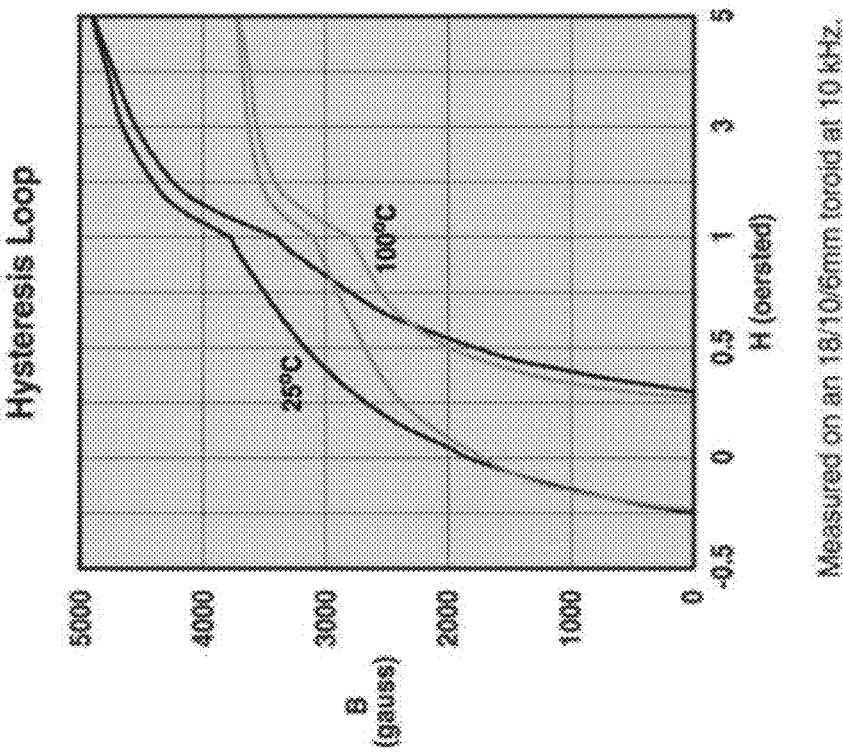
Figure 13D:
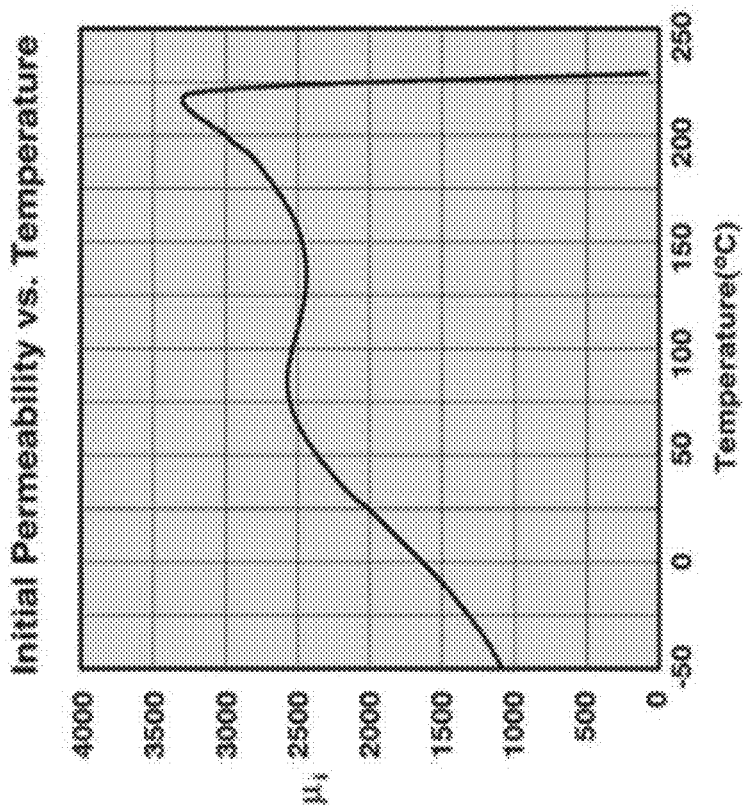
Figure 13G:
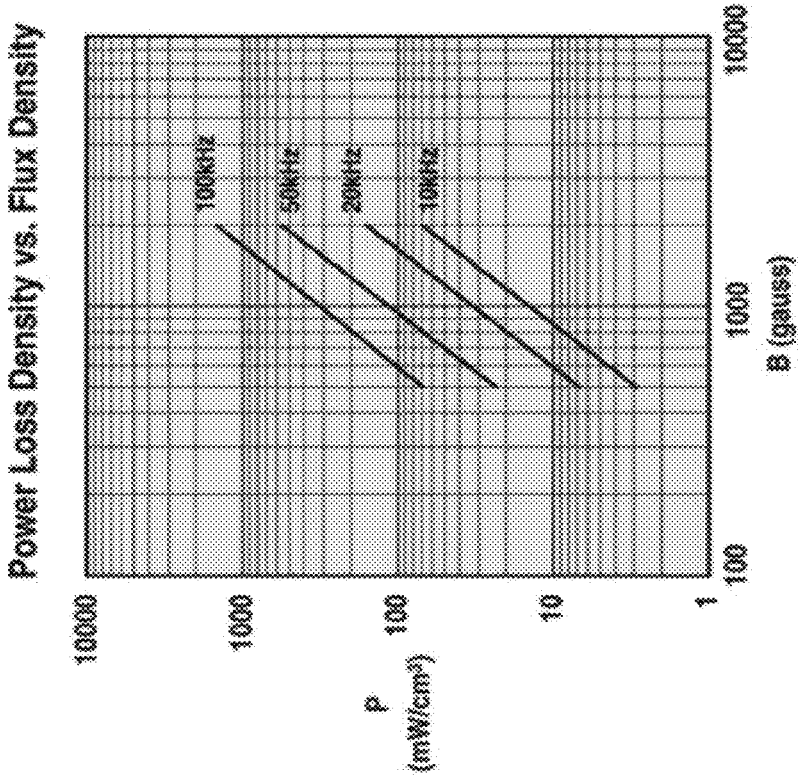
Figure 13F:
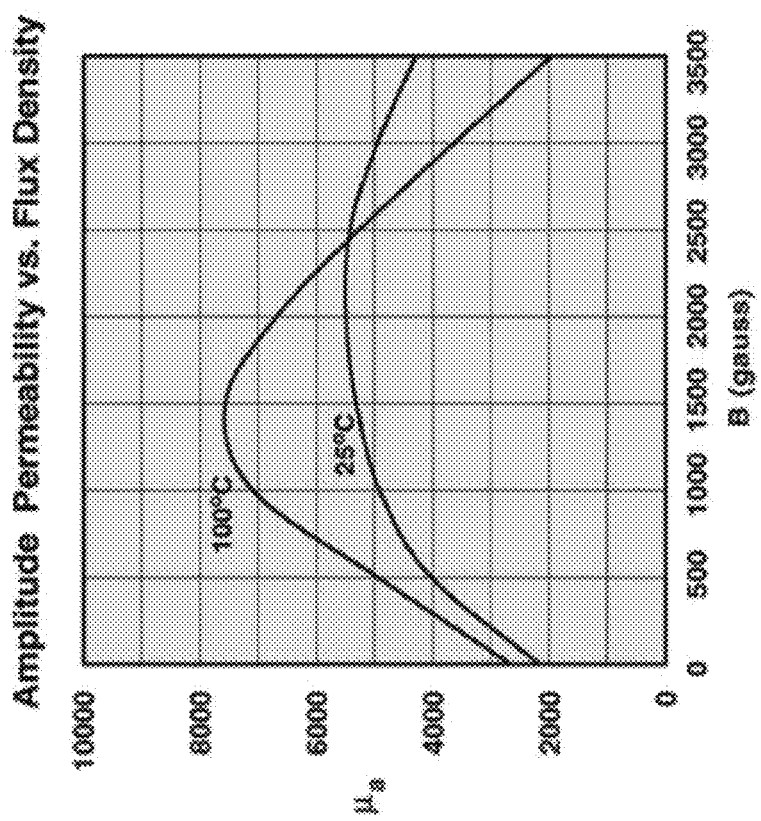
Figures 13H, 13I:
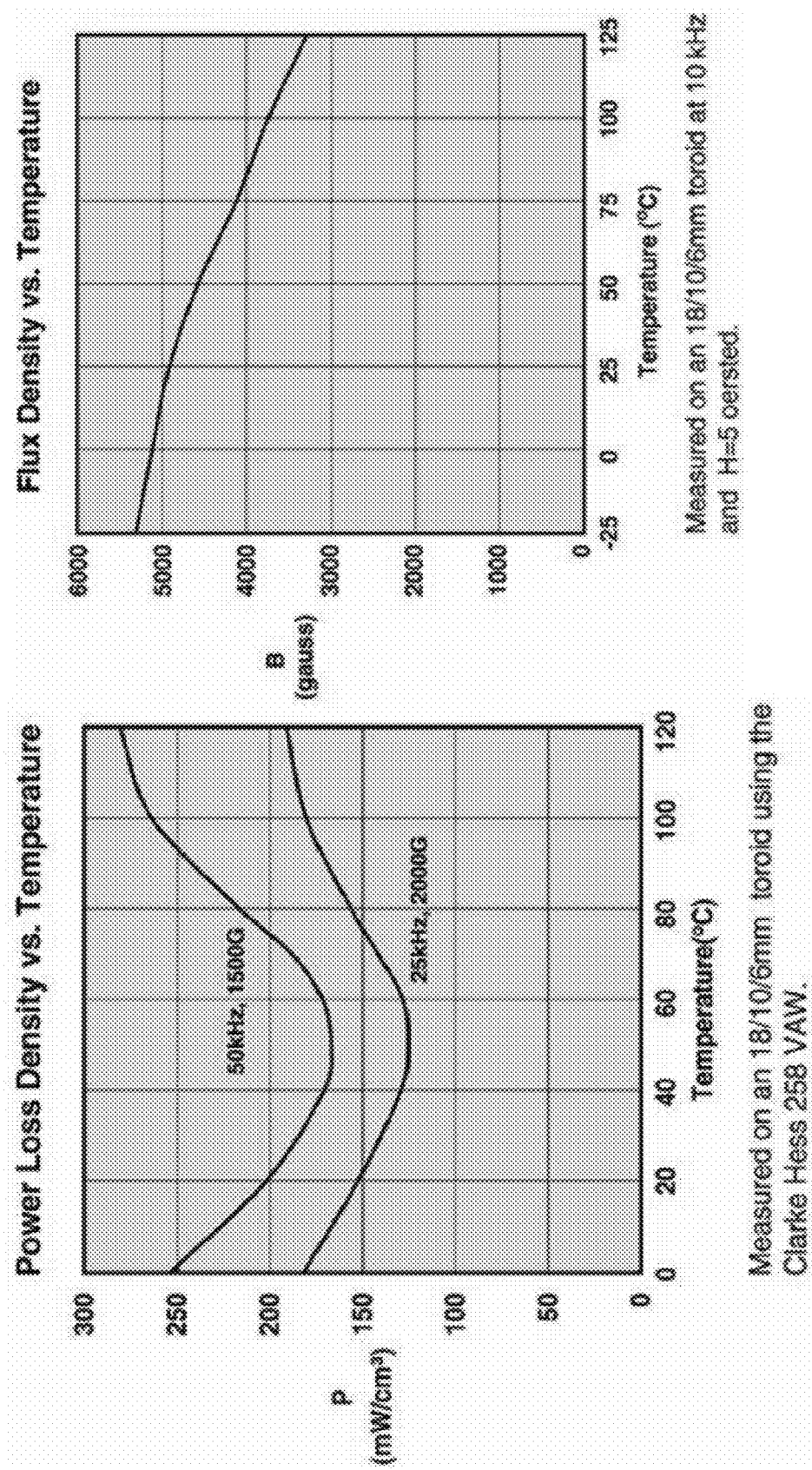

In some embodiments, the instant invention can utilize Manganese-Zinc ferrite material having characteristics given in FIG. 13A and that exhibits behaviors shown in FIGS. 13B-13I. In some embodiments, for FAPs, the instant invention can utilize some other material(s) whose characteristics and behaviors are substantially analogous or similar to the characteristics and behaviors of the Manganese-Zinc ferrite material so that the other material(s) sufficiently performs function(s) required in accordance with principle(s) of the instant invention.

In some embodiments, for FAPs structures, one or more of particular ferrite materials is selected based at least in part on a particular application of a device for which respective FAPs are to be used. In some embodiments, for FAPs structures, one or more of particular ferrite materials is selected based at least in part on the particular application and operational condition(s) of the device for which respective FAPs are to be used. In some embodiments, for FAPs structures, one or more of particular ferrite materials is selected based at least in part on the selected ferrite material having a Curie temperature within the maximum operating temperature of the particular device.

In one example, a typical insulation system temperature of an inductive device is, inter alia, approximately 200 degrees Celsius. In one example, at light loads, a temperature of the inductor is well below the Curie temperature of the FAPs. In one example, since a temperature of the inductor is well below the Curie temperature of the FAPs, high permeability FAPs (22, 22a, 23, 23a, 24, and 24a) hence can increase the inductance of the input inductances 7, 8, and 9 and output inductances 10, 11, and 12 coils, see for example FIGS. 1A-C, 2A-B, 4A-B, by adding more high permeability magnetic material in the magnetic path of the coils. In one example, the increased inductance can reduce the current harmonic distortion at light loads. In one example, the increased inductance at light loads also can initially increase the current harmonic distortion at full load because it can create non-linear inductance characteristics in the filter.

In some embodiments of the instant invention, the permeability of FAPs can increase to a high permeability once the temperature of FAPs is reduced below the Curie temperature when the inventive inductive device is at reduced load. For example, in some embodiments of the instant invention, as shown in FIGS. 1-4, at light loads, before FAPs (22, 22a, 23, 23a, 24, and 24a) are saturated with low current through inductances (7, 8, 9, 10, 11, and 12), FAPs would have an elevated inductive impedance which can reduce the harmonic currents, especially high harmonic currents. In some embodiments of the instant invention, as the load current is increased, FAPs (22, 22a, 23, 23a, 24, and 24a) would start to magnetically saturate. In some embodiments of the instant invention, while FAPs (22, 22a, 23, 23a, 24, and 24a) still help to elevate impedance to help to reduce harmonic distortion, FAPs (22, 22a, 23, 23a, 24, and 24a) can also create non-linear inductance characteristics in the inductances (7, 8, 9, 10, 11, and 12) which can increase current harmonic distortion. In some embodiments of the instant invention, initially, as the load current through the inductances (7, 8, 9, 10, 11, and 12) is increased to near full load, FAPs (22, 22a, 23, 23a, 24, and 24a) would have the net effect of increasing harmonic distortion similar to devices without FAPs (22, 22a, 23, 23a, 24, and 24a). However, in some embodiments, when FAPs' (22, 22a, 23, 23a, 24, and 24a) temperature exceed their Curie temperature due to the full load losses, FAPs (22, 22a, 23, 23a, 24, and 24a) become non-magnetic. When FAPs (22, 22a, 23, 23a, 24, and 24a) are non-magnetic condition, the inductances (7, 8, 9, 10, 11, and 12) are sufficiently close to being linear inductances throughout the operating range, and the inventive device operates as if FAPs (22, 22a, 23, 23a, 24, and 24a) were not present, eliminating the detrimental effects of the non-linearities at full load.

In some embodiments, in situations of operating at full load for an extended period of time and then returning to light load, FAPs (22, 22a, 23, 23a, 24, and 24a) would initially be non-magnetic and positive effects of any increased inductive impedance would not be apparent until the particular inventive device is cooled down and FAPs' (22, 22a, 23, 23a, 24, and 24a) temperature is below their Curie temperature.

In some embodiments of the instant invention, FAPs can also be made from suitable materials such as, but not limiting to, powdered iron or sendust. In some embodiments, the suitable FAPs materials can have non-ferrite-based compositions and can have theirs Curie temperatures over about 400 degrees Celsius. In some embodiments of the instant invention, the harmonic mitigating device constructed with the suitable FAPs materials can allow for improved performance at lighter loads.

In some embodiments, the FAPs materials can be composed of one or more materials that can have suitable relative permeability of about 14 to about 550. The relative permeability ($\mu_r$), is the ratio of the permeability of a specific medium to the permeability of free space given by the magnetic constant:

$$\mu_0 = 4\pi \times 10^{-7} \frac{N}{A^2}$$

(i.e., $4\pi \times 10^{-7} \approx 1.2566370614 \ldots \times 10^{-6}$ H·m$^{-1}$ or N·A$^{-2}$). In some embodiments, regarding the suitable materials with permeability that is less than the ferrites' permeability, a thicker FAP piece of such material may be required and/or less insulation material (e.g., Nomex) in the gaps. In some embodiments, the suitable materials with permeability that is less than the ferrites' permeability can have Curie temperatures up to about 940 degrees Celsius.

In some embodiments, the effective magnetic permeability or effective permeability is dependent on the initial permeability of a magnetic material and dimensions of a gap and circuit.

In some embodiments, the suitable FAP materials can be made from molypermalloy powder materials having composition(s) of about 80% nickel and about 20% iron, with the balance being other suitable compound(s)/element(s). In some embodiments, the suitable FAP materials can be made from molypermalloy powder materials having composition(s) of about 50% nickel and about 50% iron, with the balance being other suitable compound(s)/element(s). In some embodiments, the suitable FAP materials can be made from molypermalloy powder materials having composition(s) of about 70% nickel and about 30% iron, with the balance being other suitable compound(s)/element(s). In some embodiments, the suitable FAP materials can be made from molypermalloy powder materials having composition(s) of about 70% nickel and about 20% iron, with the balance being other suitable compound(s)/element(s). In some embodiments, the suitable FAP materials can be made from alloy(s) of iron, silicon and aluminum.

In some embodiments, the suitable FAP materials are materials that can exhibit variable permeability under different conditions, such as, but not limiting to, changes in magnetic flux density (B) and/or their temperatures. For example, in some embodiments, the permeability of the suitable FAP materials can substantially decrease when they are subjected to a sufficient magnetic flux density (B). For example, in some embodiments, the permeability of the can substantially decrease when they are subjected to sufficiently high temperature(s). For example, in some embodiments, the permeability of the suitable FAP materials can substantially decrease when being subjected to the sufficient magnetic flux density (B) and the sufficiently high temperature(s). For example, in some embodiments, the sufficiently high temperature(s) are the Curie temperature(s) of the suitable FAP materials.

In some embodiments of the instant invention, the inductance change can be linear. In some embodiments of the instant invention, only FAPs pieces are saturate. In some embodiments of the instant invention, there is (are) insignificant noise and/or heat generation from FAPs. Some embodiments of the instant invention can be easy to construct. Some embodiments of the instant invention can result moderate tooling cost. Some embodiments of the instant invention can be easily adapted to existing filter designs. Some embodiments of the instant invention, having Curie temperature of about 140 degrees Celsius, provide optimally flat inductance at rated current.

Figure 8A:
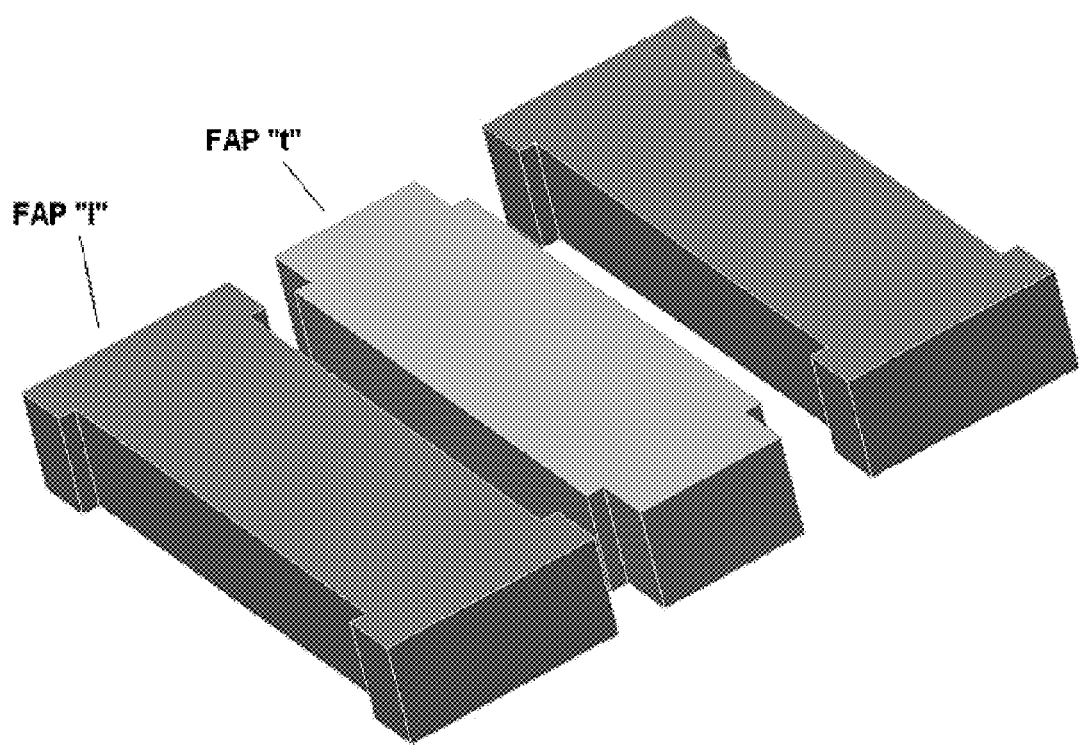
FIGS. 8A-8B illustrate certain features of some embodiments of the present invention.
Figure 8B:
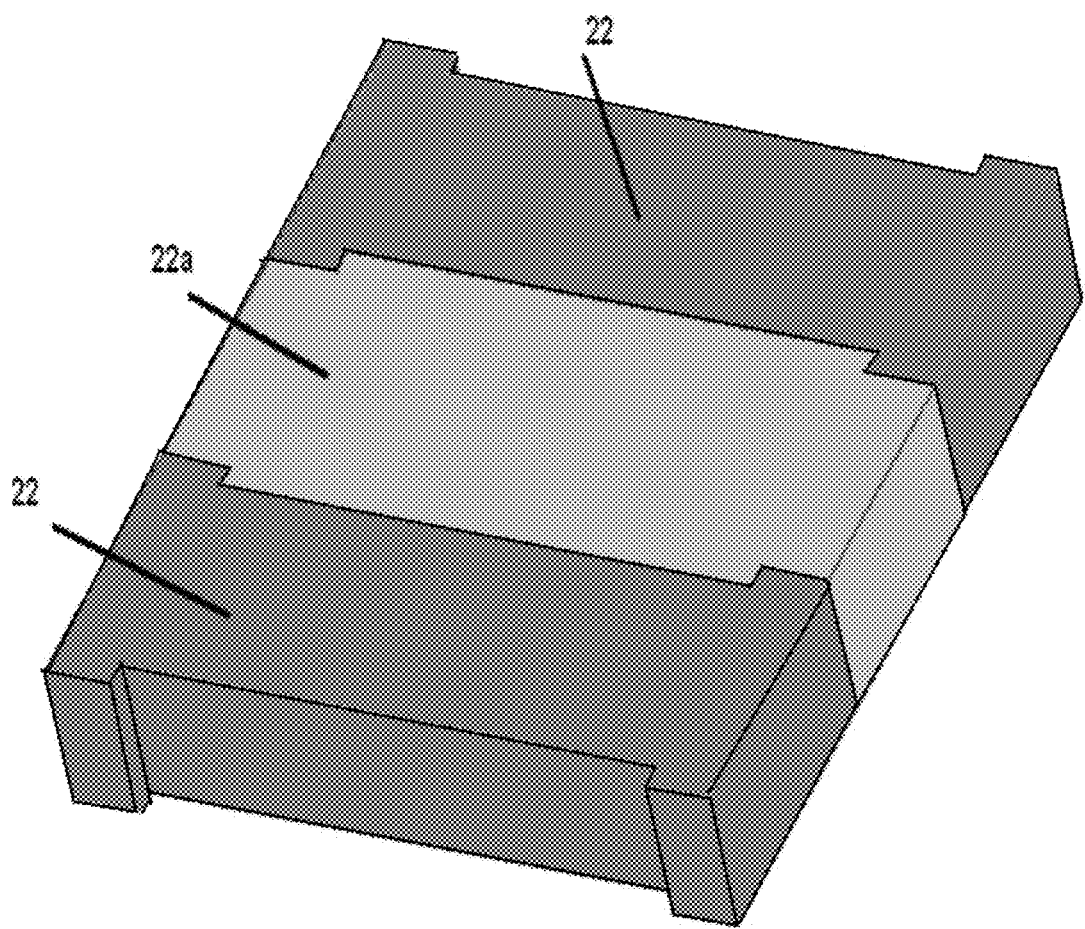

In some embodiments of the instant invention, FAPs pieces (e.g., FAP "I" and FAP "t" as shown in FIGS. 8A-B) can have any configuration which provides desirable adaptive passive filtering. In some embodiments of the instant invention, FAPs can have any suitable thickness which provides desirable adaptive passive filtering. In some embodiments, FAPs in the multi-part core can be united by various suitable interlocking shapes. In some embodiments, each FAP in a multi-part core can have different shape/configuration, thickness, and/or composition from at least one other FAP in the multi-part core. In some embodiments, FAPs can be made from one or more materials that would have, by itself and/or in combination, a desired Curie temperature.

Figure 9:
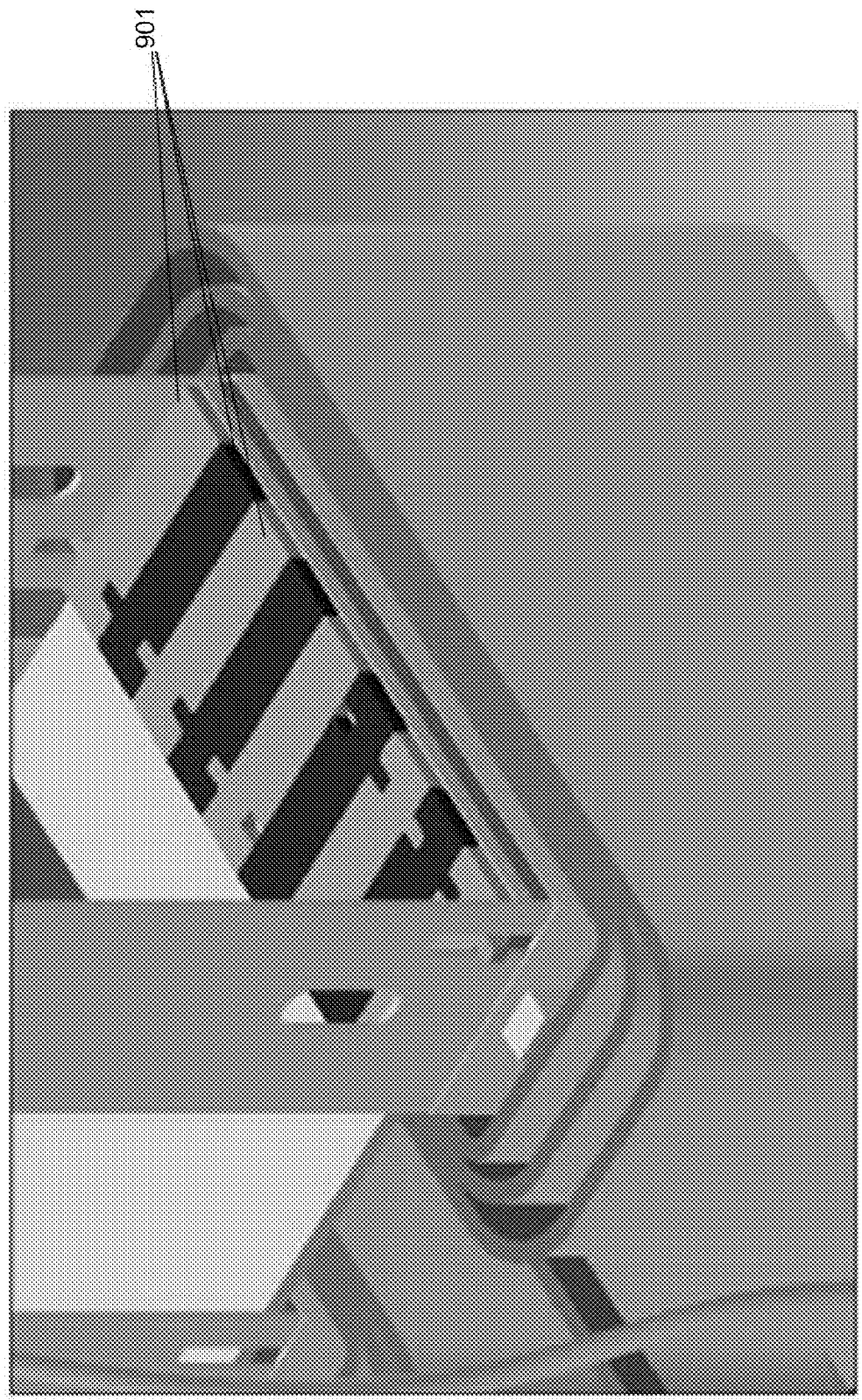
FIG. 9 illustrates certain features of some embodiments of the present invention.
Figure 11A:
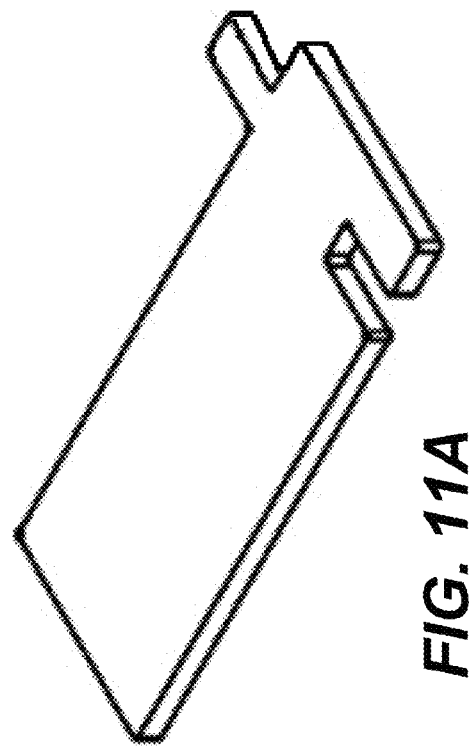
FIGS. 11A-11B illustrate certain features of some embodiments of the present invention.
Figure 11B:
Figure 10A:
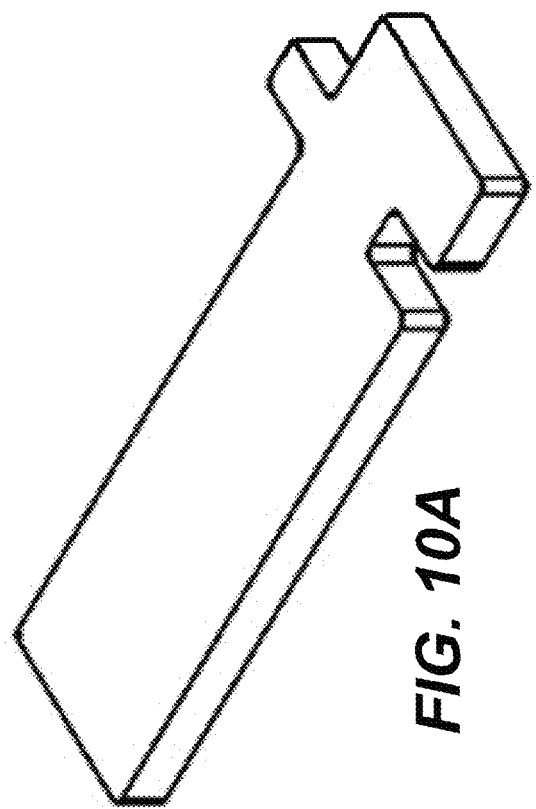
FIGS. 10A-10B illustrate certain features of some embodiments of the present invention.
Figure 10B:
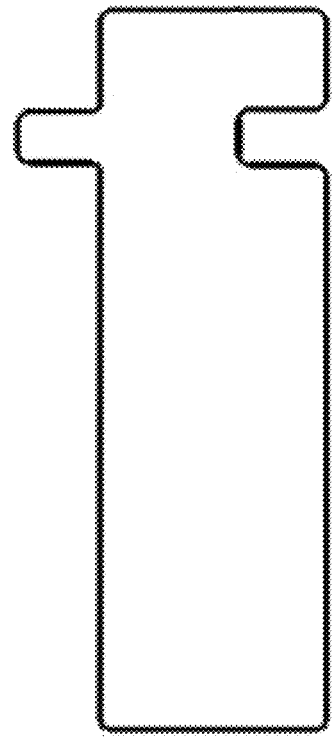

For some embodiments, FIGS. 2A-B, FIG. 3 and FIGS. 4A-B show the exemplary positions for FAPs within the devices of the instant invention, but not limiting to, —FAPs 22, 22a, 23, 23a, 24, and 24a. In some embodiments of the instant invention, FAPs can, for example, have shapes shown in FIG. 5. In some embodiments of the instant invention, the notches 44 can be used to lock together with the protrusions 41 as shown in FIG. 6. In some embodiments of the instant invention, FAPs, shown in FIG. 5 and FIG. 6, can be locked together in ways, for example, shown in FIG. 7 and FIGS. 8A-B. In some embodiments of the instant invention, the notches 44 can be used to position and/or secure FAPs within the devices of the instant invention with the aid of brackets 31-36 shown in FIGS. 4A-B. In some embodiments, as shown in FIG. 9, bracket(s) holding the core of the inductor can have structure(s) (e.g., a cutout) that is adapted to accept/interlock with shape(s) of FAPs material(s) (e.g., protrusions) to guide into and/or secure FAPs in their desired uniformed position within inductor(s) so that inductances are balanced.

Figure 5:
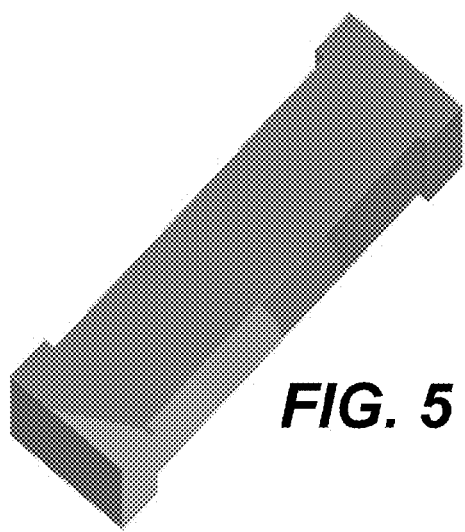
FIG. 5 illustrates certain features of some embodiments of the present invention.
Figure 6:
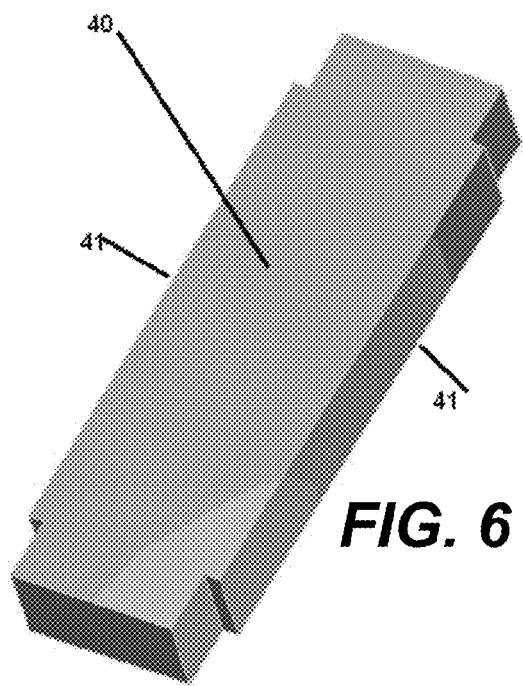
FIG. 6 illustrates certain features of some embodiments of the present invention.
Figure 7:
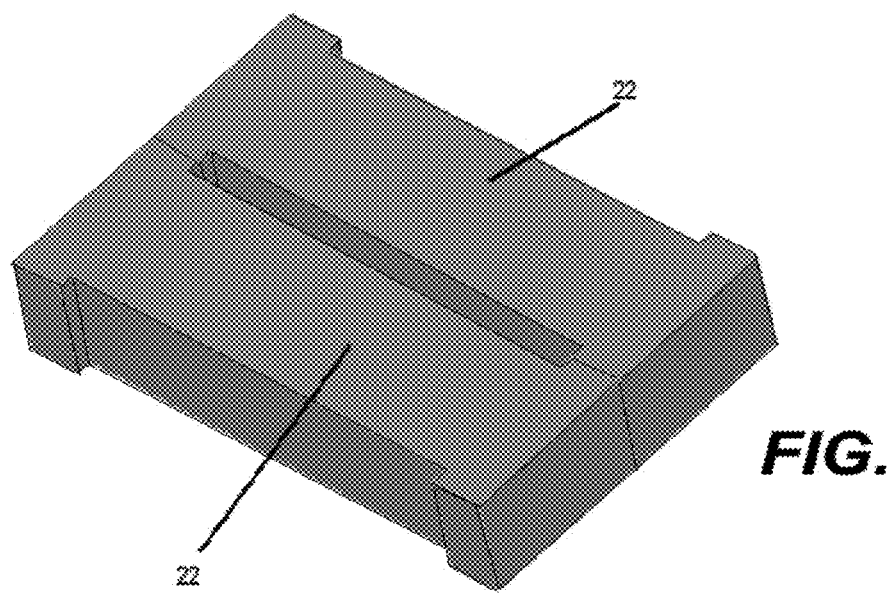
FIG. 7 illustrates yet certain features of some embodiments of the present invention.

In some embodiments of the instant invention, as shown in FIGS. 5 and 6, FAPs, the interlocking high permeability core gap pieces, can interlock by way of a notch 44 and a protrusion 41. In some embodiments of the instant invention, as shown in FIGS. 8A-B, FAPs pieces can be further divided into FAP "I" and FAP "t" structures based at least in part on their shapes and/or size.

In some embodiments, as illustrated in FIGS. 9, 10A-B and 11A-B, FAPs (901) can have various designs (e.g., various forms/shapes). In some embodiments, FAPs (901) of the same form per a lamination size can be used in creating the FAP element, by stacking FAP pieces to the core depth. In some embodiments, the slots in the straps and the interlocking shapes of FAPs can assist to position FAPs (901) with respect to the core. In some embodiments, FAPs having shapes, shown in FIGS. 9, 10A-B and 11A-B, are referred herein as so-called FAP "C" pieces.

In some embodiments of the instant invention, FAPs can be stacked on top of each other or next to each other. In some embodiments, the stackable FAPs can be stacked at different depths depending on a particular desired rating of a device.

In some embodiments, the instant invention can also utilize an insulator having sufficiently high dielectric constant—e.g., one or more gap insulator piece, items 28, 29, 30 in FIGS. 2A-B and 4A-B. In some embodiments, the insulator piece(s) can have one or more suitable compositions containing materials such as, but not limited to, Nomex® (Dupont).

Figure 2A:
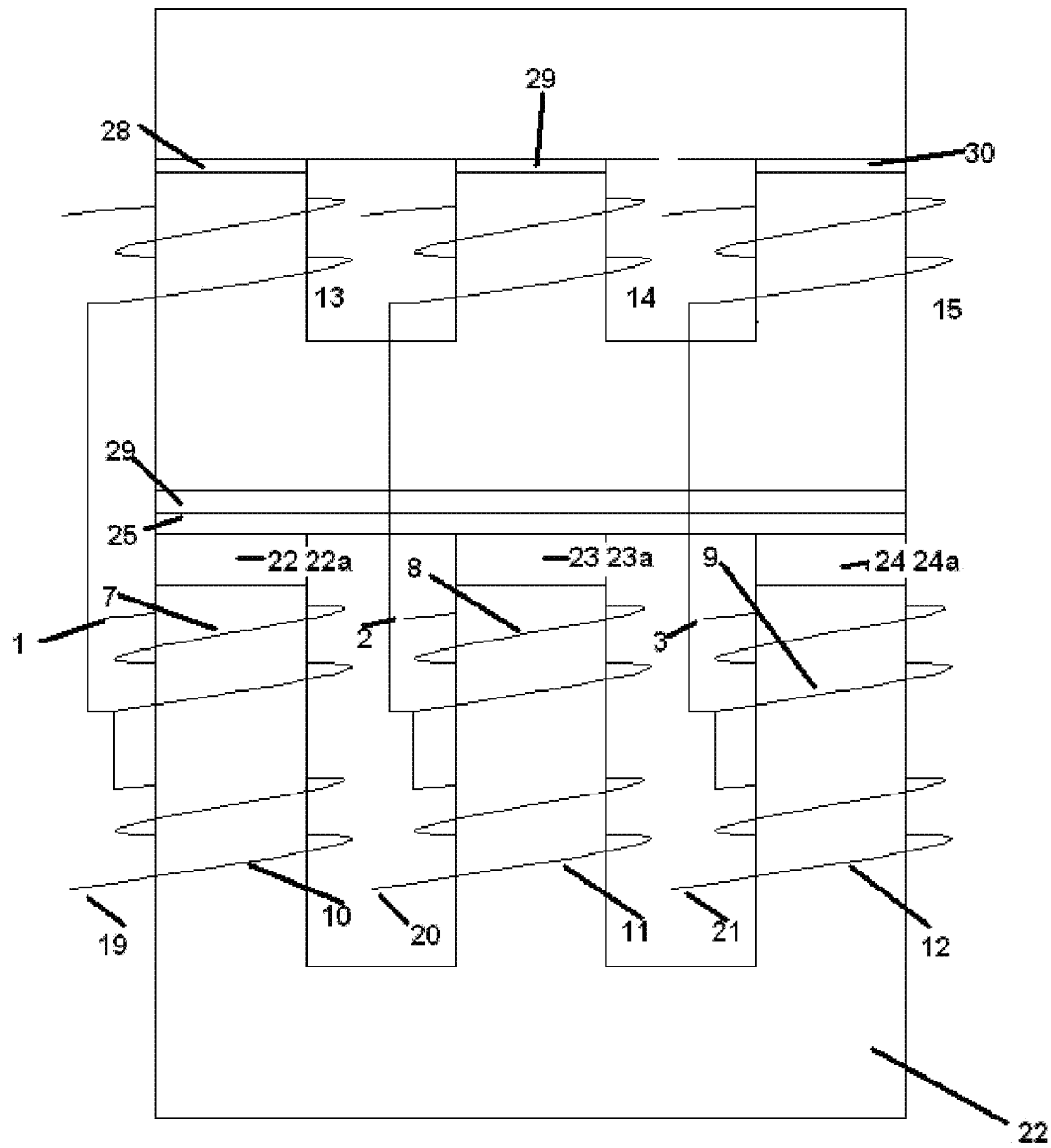
FIG. 2A illustrates certain features of some embodiments of the present invention.
Figure 2B:
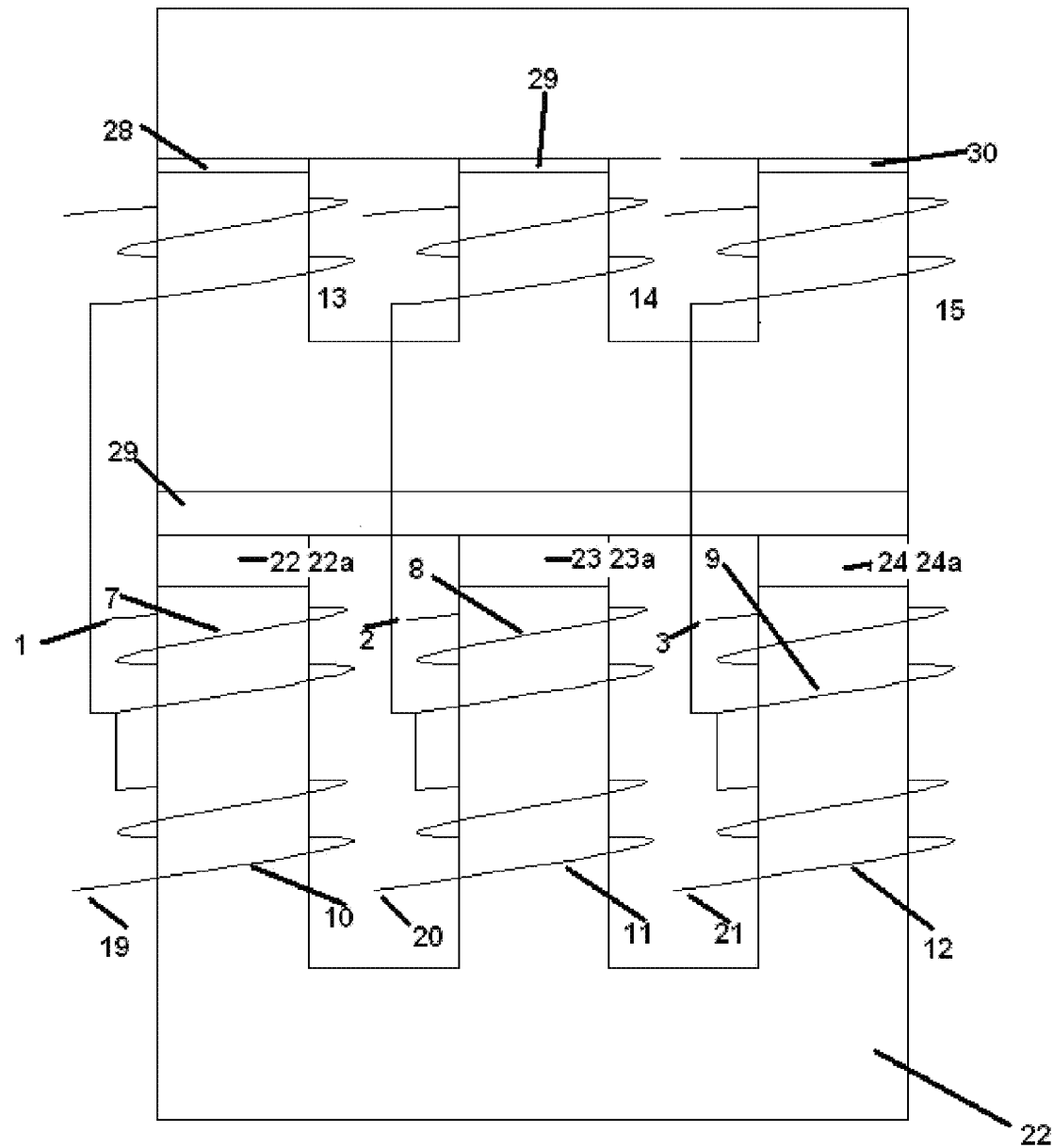
FIG. 2B illustrates certain features of some embodiments of the present invention.
Figure 3:
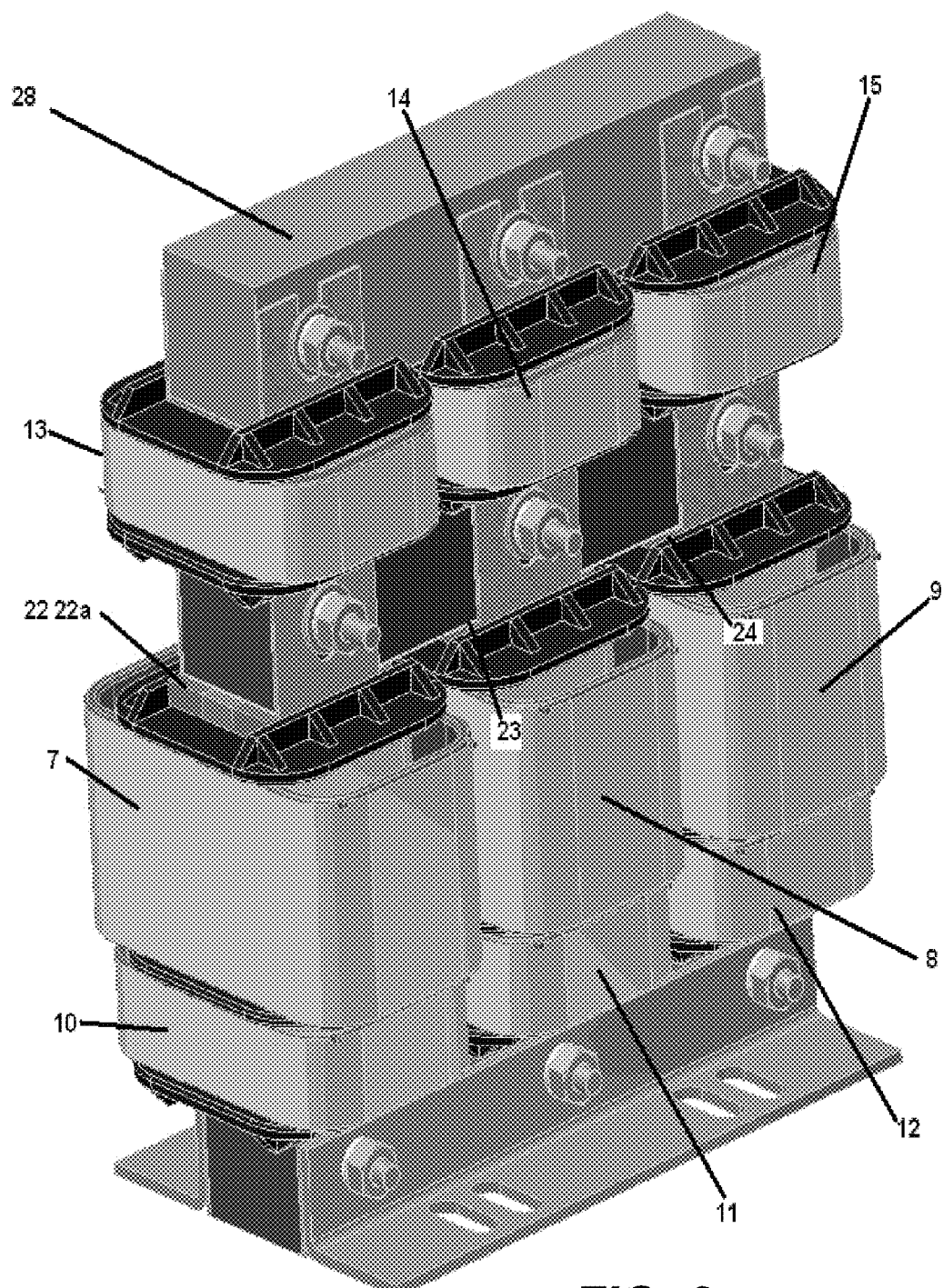
FIG. 3 illustrates certain features of some embodiments of the present invention.
Figure 4A:
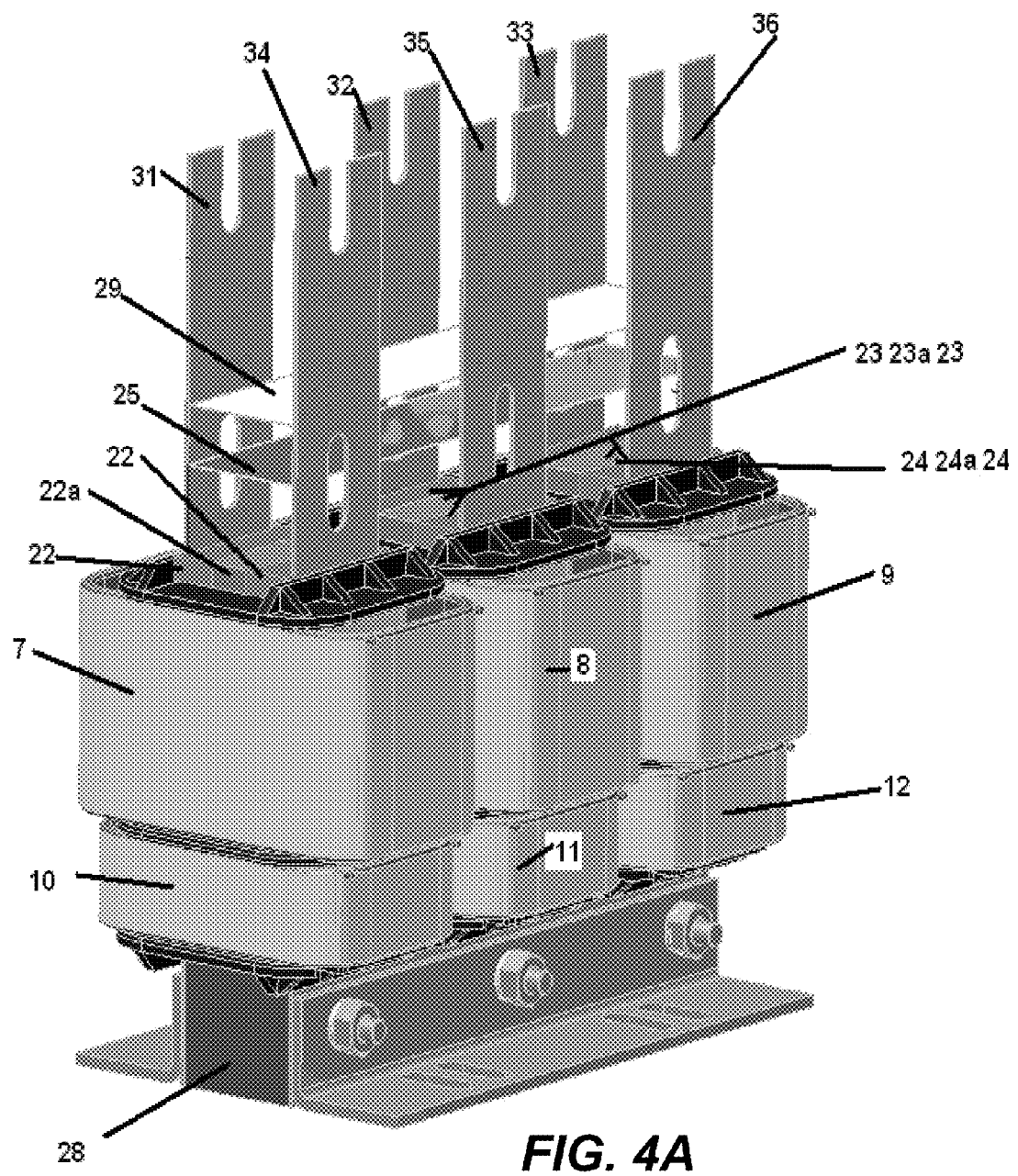
FIG. 4A illustrates certain features of some embodiments of the present invention.
Figure 4B:
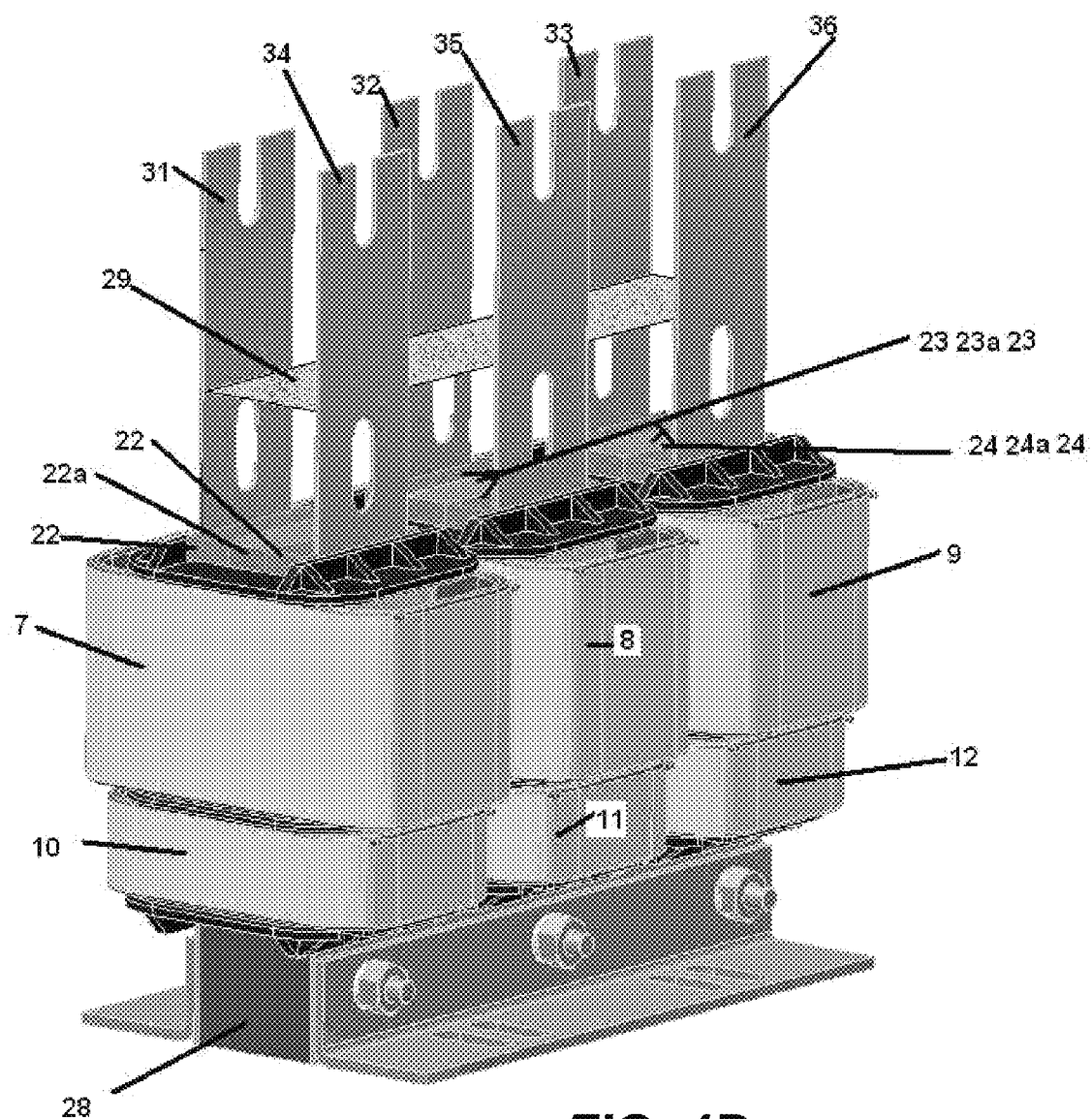
FIG. 4B illustrates certain features of some embodiments of the present invention.

In some embodiments, the instant invention provide a metallic gap piece, shown, for example, as item 25 in FIGS. 2A and 4A, that creates so-called "MAP" piece(s). In some embodiments, MAPs can act as the magnetic flux controlled ferrite-based heating elements to heat the FAPs materials. FIGS. 1A-B schematically show some embodiments of the instant invention that include MAPs (items 42-47).

In some embodiments of the instant invention, a MAP piece is a magnetic flux controlled FAP-heating element. In some embodiments of the instant invention, at full load currents, the magnetic flux density in the core can be higher. In some embodiments of the instant invention, the magnetic flux in the core is perpendicular to the MAP, therefore it produces eddy currents in the MAP structure. In some embodiments of the instant invention, the produced eddy currents generate heat. In some embodiments of the instant invention, the MAP piece can then heat FAPs up to the Curie temperature near full load operation. In some embodiments of the instant invention, when FAPs reach the Curie temperature, FAPs become non-magnetic as, for example, shown by diagrams of FIGS. 12 and 13D, with some materials which can be utilized in FAPs of those embodiments of the instant invention. In some embodiments of the instant invention, when FAPs become non-magnetic, the inductance characteristics become linear throughout the operating range. In some embodiments of the instant invention, the harmonic distortion at full load current can be returned to optimal range.

In some embodiments of the instant invention, the thickness and size of MAP pieces can be adjusted to control the amount of heat MAPs generate. In some embodiments of the instant invention, a thicker and/or more conductive MAP will typically heat FAPs more and/or faster than a thin and/or less conductive MAP. In some embodiments of the instant invention, MAPs can be typically made from, but not limited to, copper, aluminum, or any other suitable material that behaves in accordance with principles of the instant invention regarding the operational relationship(s) of MAPs and FAPs.

In some embodiments of the instant invention, composition, shape/configuration, conductivity characteristics, and thickness of MAP piece(s) can vary to achieve desirable temperature to which and/or speed with which FAPs can be heated.

Figure 15:
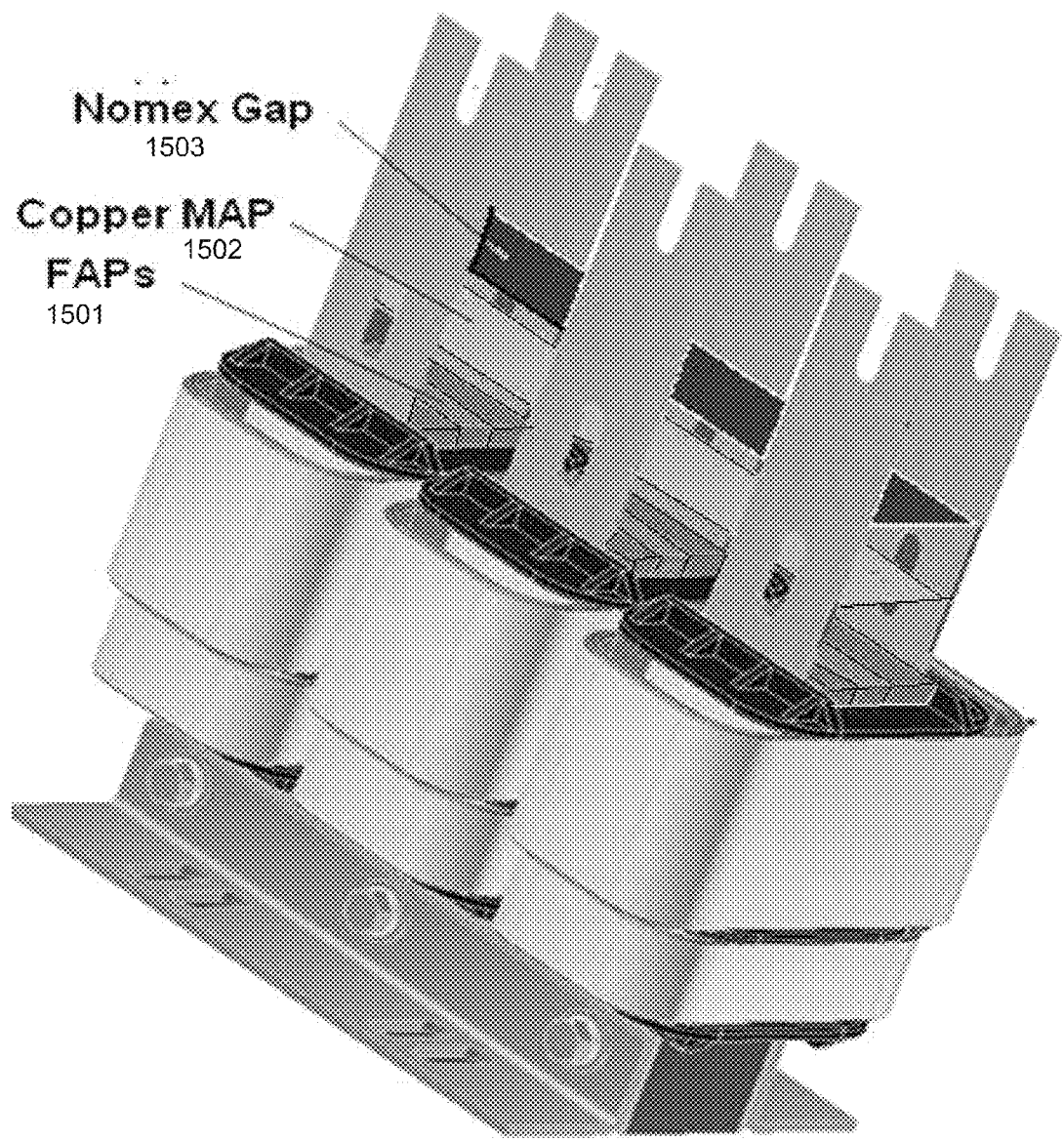
FIG. 15 illustrates certain features of some embodiments of the present invention.

In some embodiments of the instant invention, as shown in FIG. 15, an adaptive passive filter can be constructed to incorporate FAPs pieces 1501, a copper MAP piece 1502, and a Nomex insulation gap piece 1503. In some embodiments, the copper MAP piece 1502 can be used to elevate the gap temperature above about 140 degrees Celsius to trip the Curie temperature to "turn off" the inductance variation at full load. In some applications, for example with an 11 A (Ampere) test filter, a 0.008 inch thick copper foil can be used for the copper MAP piece 1502. In some embodiments, composition, shape/configuration, and thickness of the insulation piece(s) 1503 can vary to achieve desirable insulation characteristics.

Figure 16:
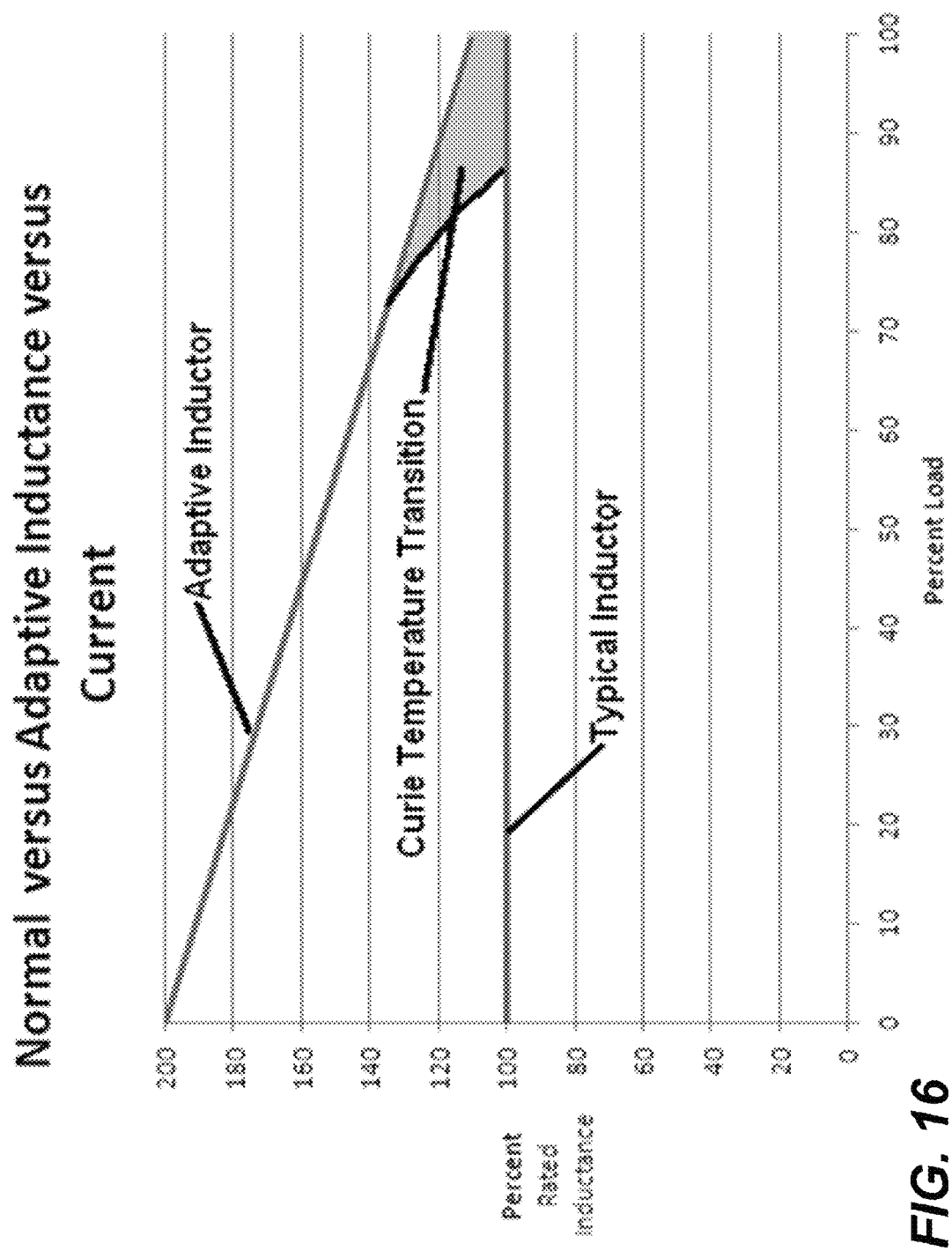
FIG. 16 illustrates certain features of some embodiments of the present invention.

FIG. 16 illustrates differences in operational characteristics between some embodiments of the instant invention and a typical inductor.

In some embodiments, the instant invention can allow an inductor to have nearly the same percent impedance throughout most of the operating range. In some embodiments of the instant invention, one inductor could be used in a multi-drive application instead of one sized for each drive. Some embodiments, the instant invention can allow inductors produced in accordance with the instant invention to have higher inductances at light loads.

SOME EXEMPLARY APPLICATIONS OF SOME EMBODIMENTS OF THE INSTANT INVENTION

Example 1

Adaptive Passive Three Phase Filter

In some embodiments, passive harmonic filters connect in series at the input to any six pulse drive. In some embodiments, being low pass filters, the passive harmonic filters attenuates each harmonic frequency, resulting in the lower harmonic distortion levels. In some embodiments, the passive harmonic filters allow for operating conditions such as unbalanced line voltages and from no load to full load. In some embodiments, the passive harmonic filters can result in provide losses that are less than one percent of the load power rating. In some embodiments, the passive harmonic filters do not cause power system resonance problems and do not attract harmonics from other non-linear loads sharing the same power source. In some embodiments, the passive harmonic filters can be utilized for variable frequency, variable torque applications.

Figure 26:
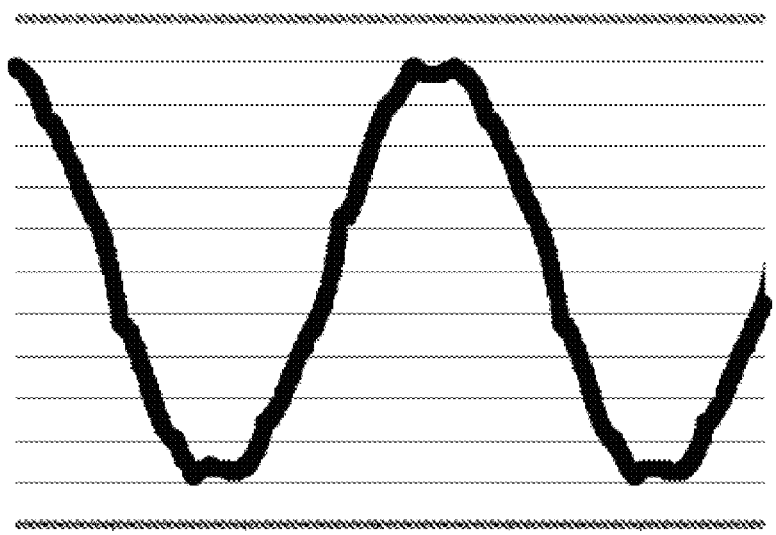
FIG. 26 illustrates certain features of some embodiments of the present invention.
Figure 27:
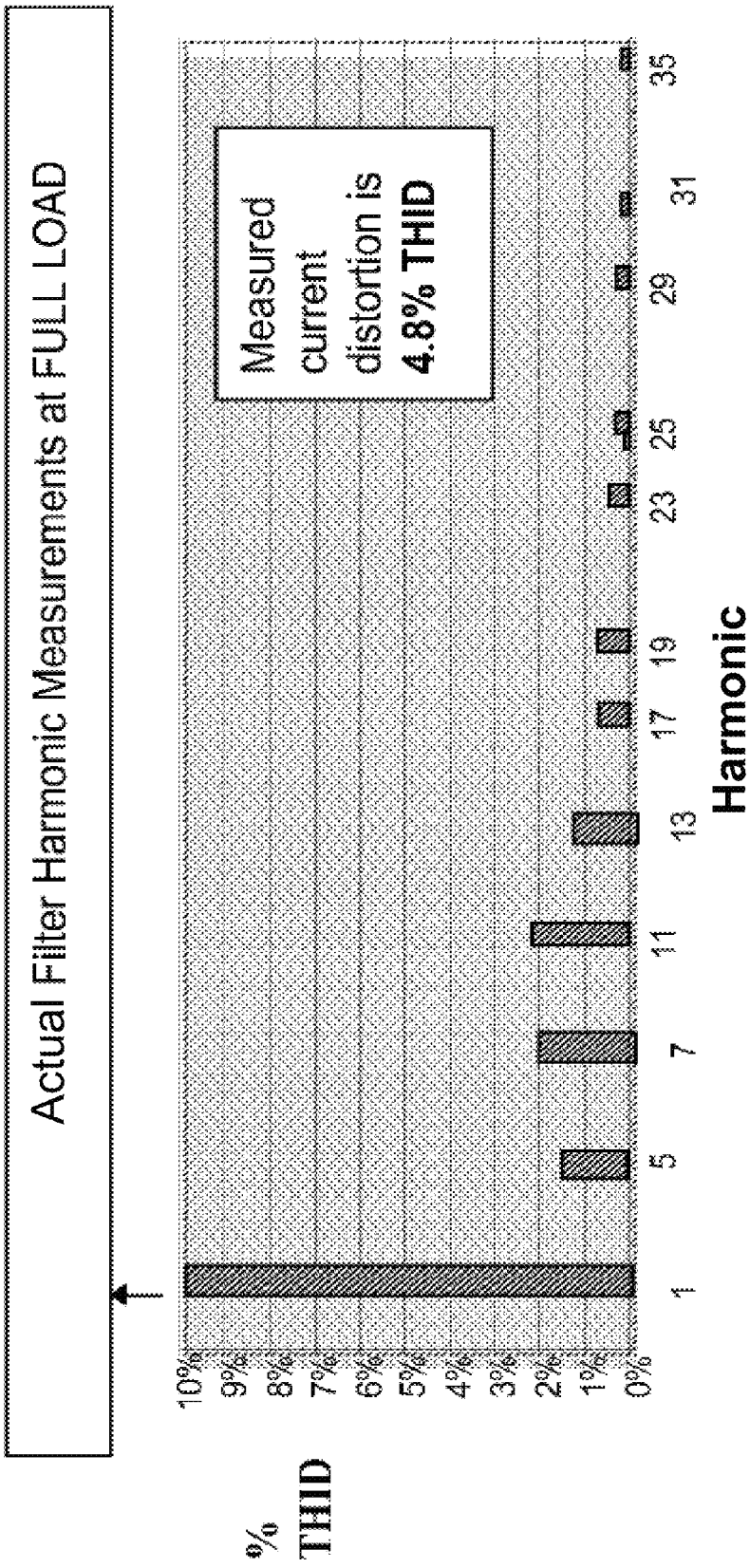
FIG. 27 illustrates certain features of some embodiments of the present invention.

In some embodiments, the passive harmonic filters of the instant invention can convert any six pulse drive to harmonic mitigation performance that is better than 18-pulse rectification. In some embodiments, the passive harmonic filters of the instant invention exhibit the input current waveform and harmonic spectrum that are demonstrated in FIGS. 26-27.

In some embodiments, due to their internal series reactance, component tolerances and circuit configuration, the passive harmonic filters of the instant invention are only mildly affected by unbalanced line voltage conditions and their performance is quite consistent from no load to full load conditions as demonstrated in FIG. 39. In some embodiments, a combination of six pulse VFD and the passive harmonic filters of the instant invention attenuated harmonics better than an eighteen pulse drive, when tested with various percentages of line voltage unbalance, and when operating at load conditions ranging from 0% to 100% load. In some embodiments, the combination of six pulse VFD and the passive harmonic filters of the instant invention also reduced harmonics to lower levels than the enhanced 18-pulse drive, which used additional line reactors.

Figure 17:
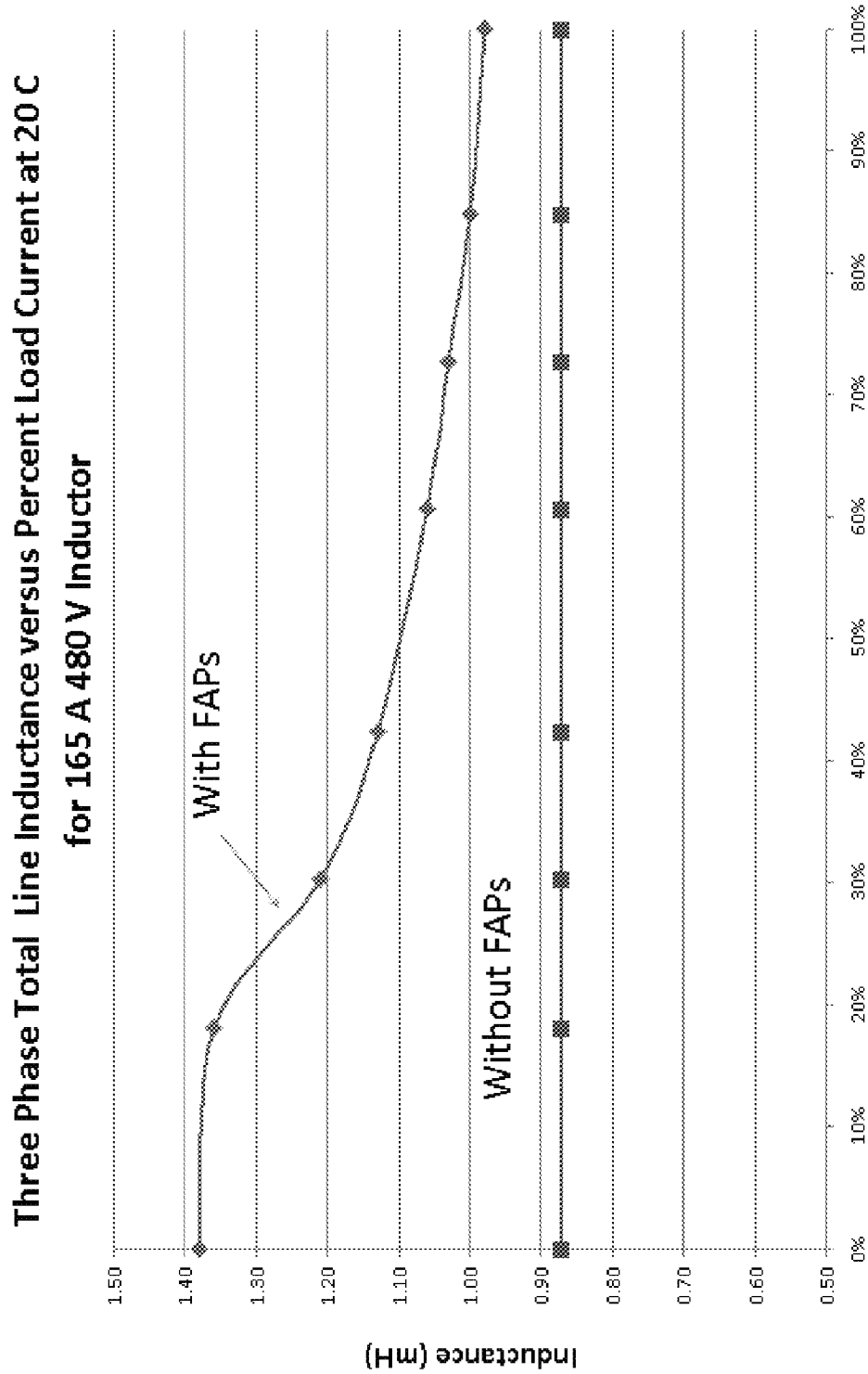
FIG. 17 illustrates certain features of some embodiments of the present invention.

In some embodiments, the instant invention provides for a passive three phase filter that includes FAPs made from Fair-Rite #77 material (FIGS. 13A-13I) which has a Curie temperature of about 200 degree Celsius. In some embodiments, the instant invention can allow to have the total line inductance of the passive three phase filter, such as, but not limiting to, passive three phase drive input filter, to be elevated by about 50% at reduced loads. FIG. 17 shows a typical line inductance curve for a 165 A three phase drive input filter without FAPs and a new line inductance curve for a modified 165 A three phase drive input filter with FAPs designed in accordance with at least some principles of the instant invention.

Figure 18:
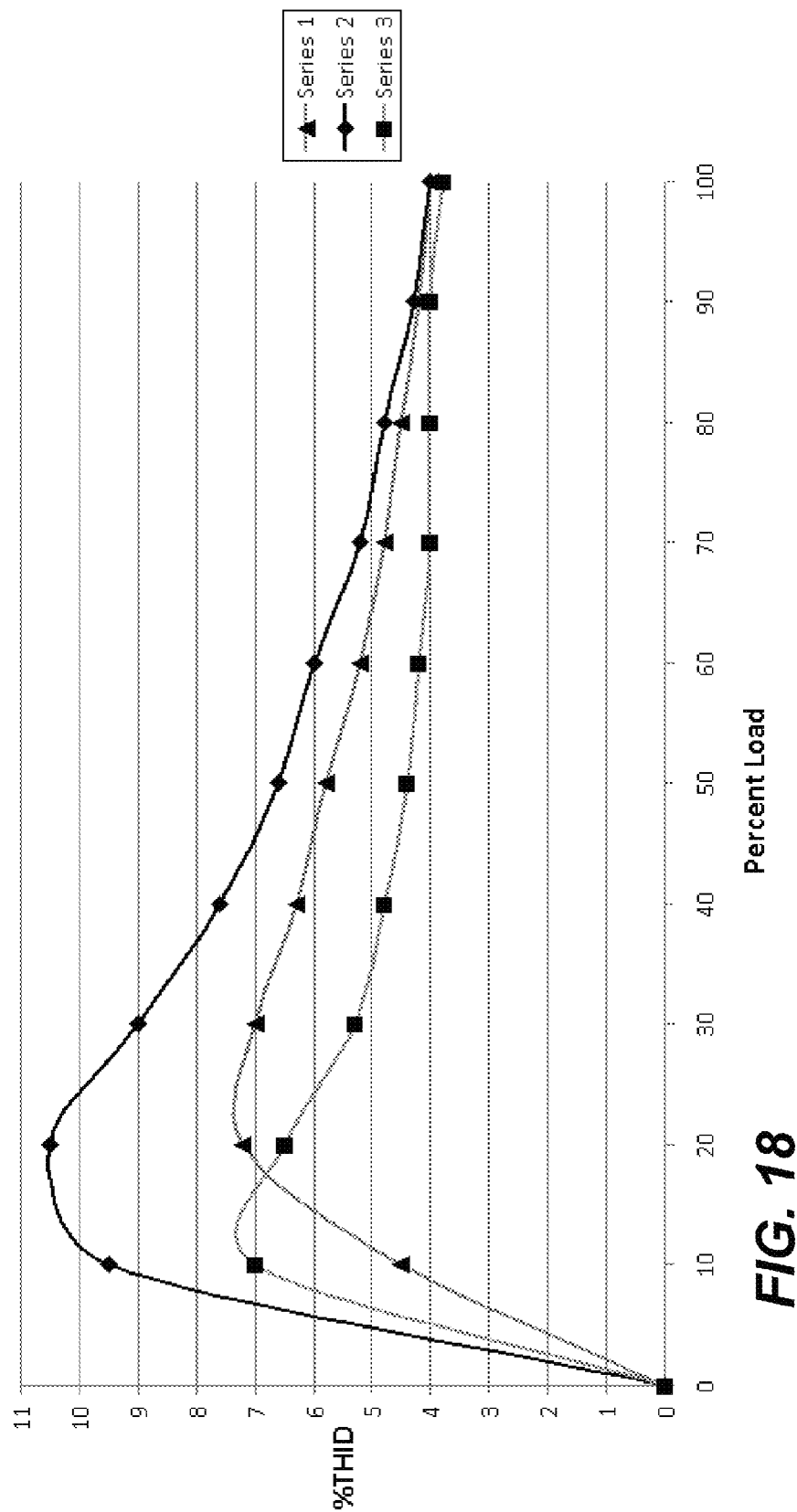
FIG. 18 illustrates certain features of some embodiments of the present invention.

For example, FIG. 18 also shows a graph which compares percent THID for passive three phase drive input filters without FAPs (series 1 and 2) with a filter that includes FAPs and designed in accordance with at least some principles of the instant invention (series 3).

Example 2

Adaptive Passive Single Phase Filter

Figure 19:
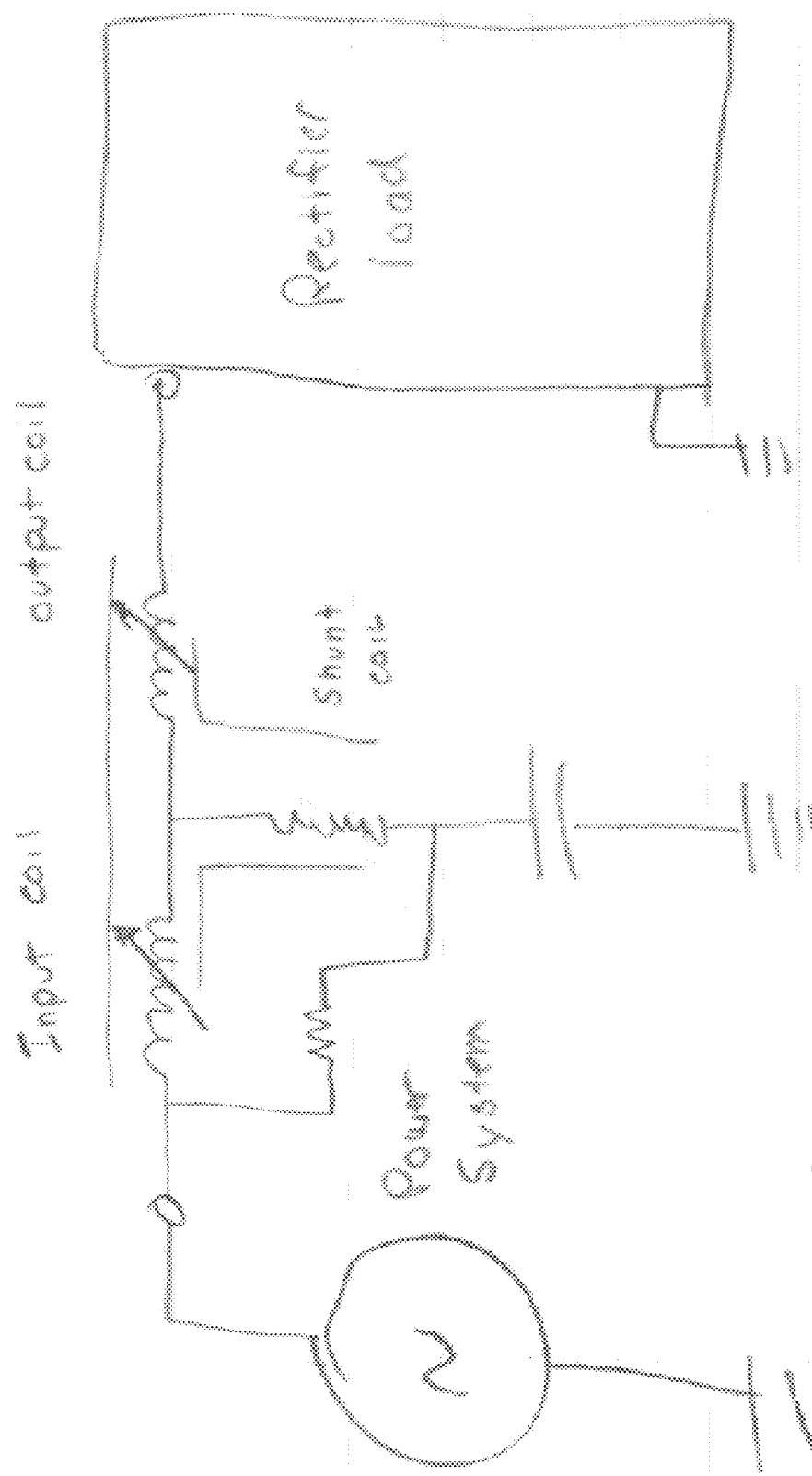
FIG. 19 illustrates certain features of some embodiments of the present invention.
Figure 20:
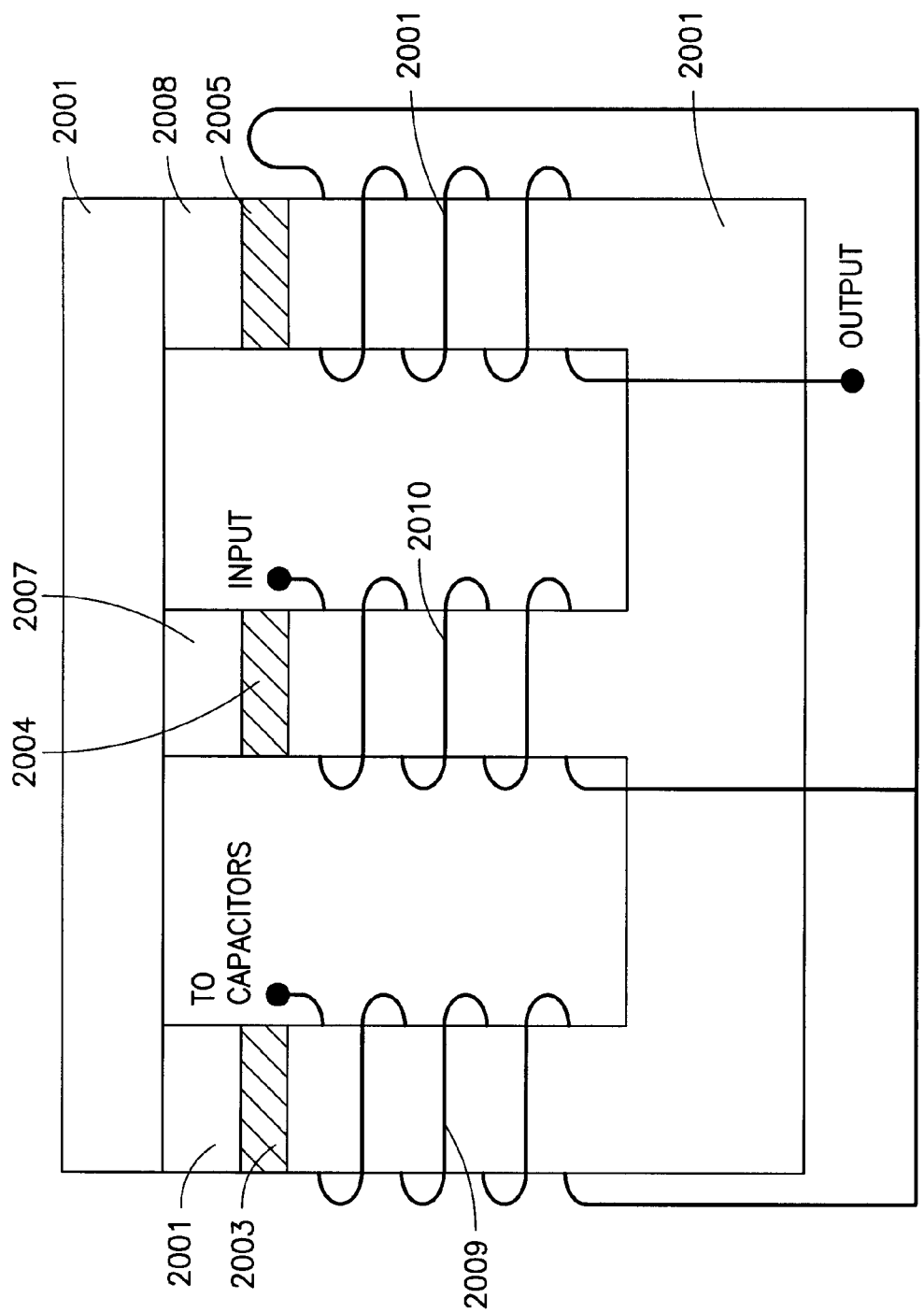
FIG. 20 illustrates certain features of some embodiments of the present invention.

In some embodiments, the adaptive passive single phase filters of the instant invention can be utilized on four pulse rectifier supplies. FIG. 19 shows a general topology of single phase filters. FIG. 20 shows a cross-section of the adaptive passive single phase inductor in accordance with some embodiments of the instant invention. FIG. 2 shows a cross-section of the adaptive passive inductor. While FIG. 20 shows an embodiment with an "EI" core construction, some embodiments of the instant invention can similarly be constructed with multiple gaps per a core leg. In some embodiments, the core can be constructed as having equal or unequal three legs. In FIG. 20, the "EI" core is identified as having three phase laminations 2001 and 2002. In FIG. 20, FAPs are marked as 2003, 2004, and 2005. In some embodiments, these FAPs may be of equal size and shape. In some embodiments, these FAPs be of different sizes and shapes. In some embodiments, thickness and number of FAPs can be optimized to elevate the inductance of both an input coil, 2010, and an output coil, 2011, and to hold a shunt coil 2009 to a constant inductance at light loads as compared to full load. In some embodiments, the shunt coil's 2009 inductance is held constant to maintain the shunt resonance frequency to 120 Hz, the primary harmonic on the single phase system. In some embodiments, remaining portions of the core gaps, 2006, 2007, and 2008, can be made from core gap insulation materials such as, but not limiting to, Nomex or any other suitable insulation material.

Figure 21:
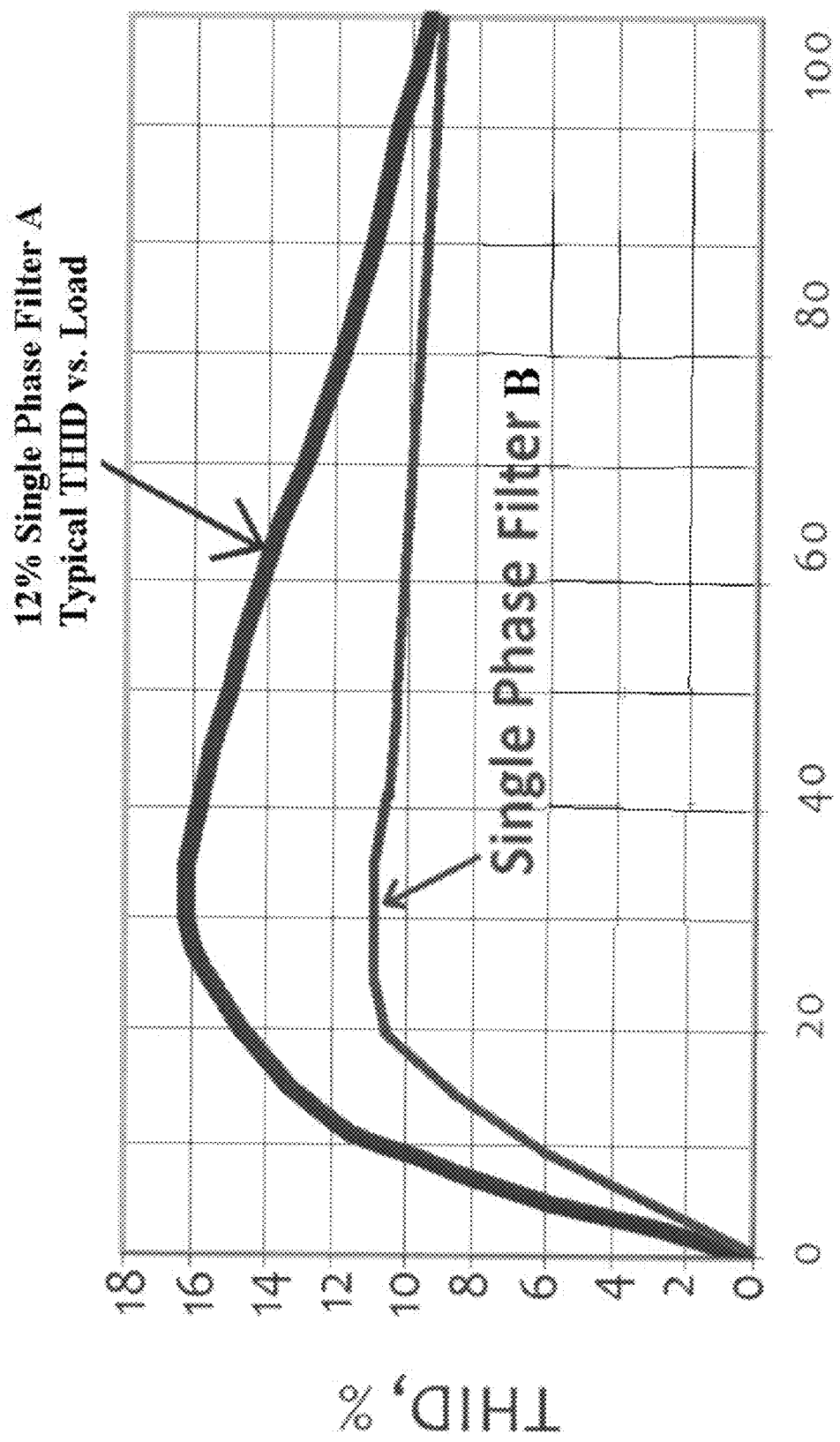
FIG. 21 illustrates certain features of some embodiments of the present invention.

In some embodiments, the instant invention allows to achieve a reduced current harmonic distortion at a reduced load. FIG. 21 shows a graph demonstrating that one of some embodiments of the instant invention (a single phase filter B) provides the reduced harmonic distortion compared to a typical single phase filter A.

Figure 22:
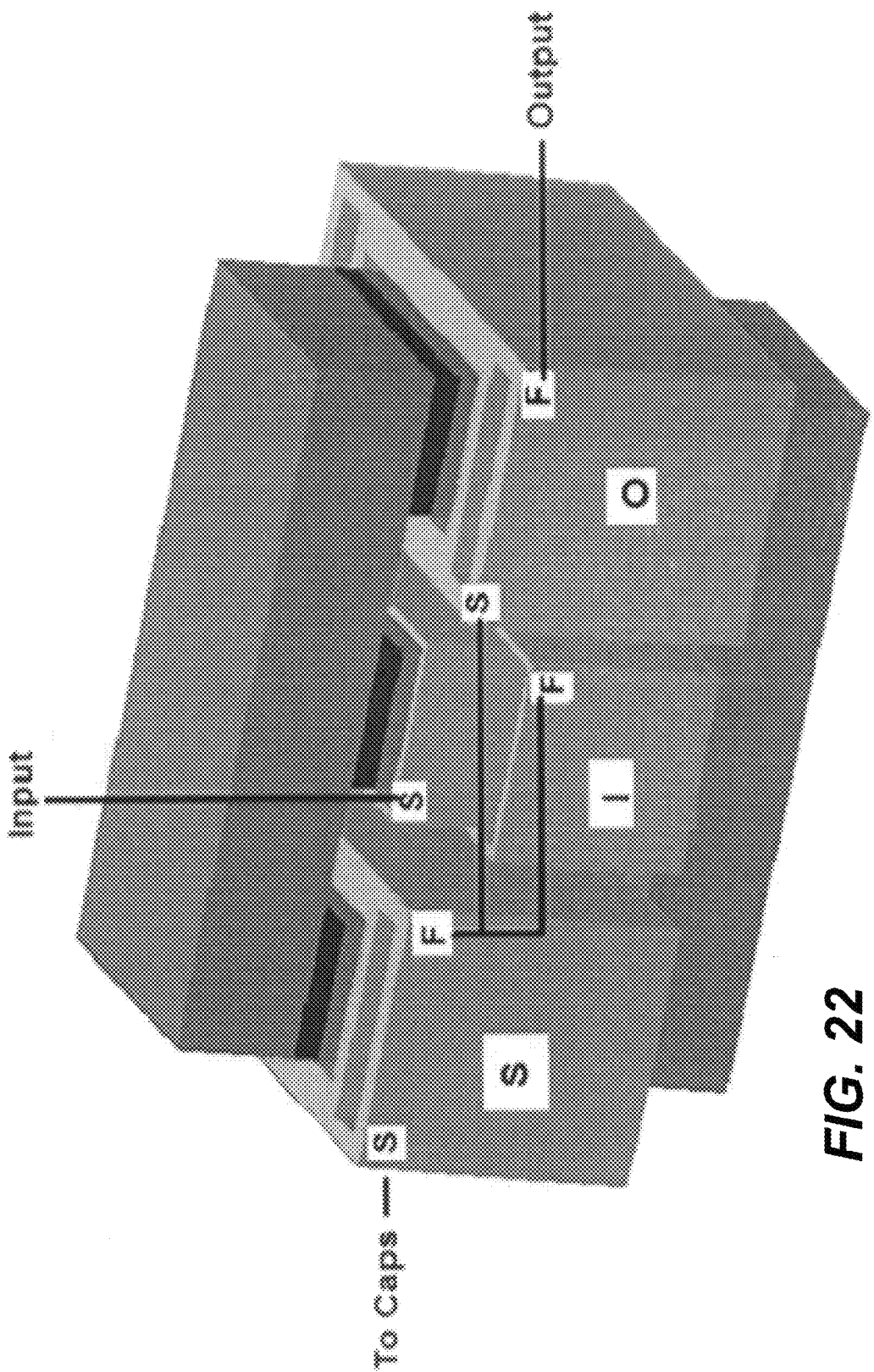
FIG. 22 illustrates certain features of some embodiments of the present invention.

In some embodiments, FIG. 22 shows another view of general connections of the single phase inductor which can be modified in accordance with principles of the instant invention.

Figure 23:
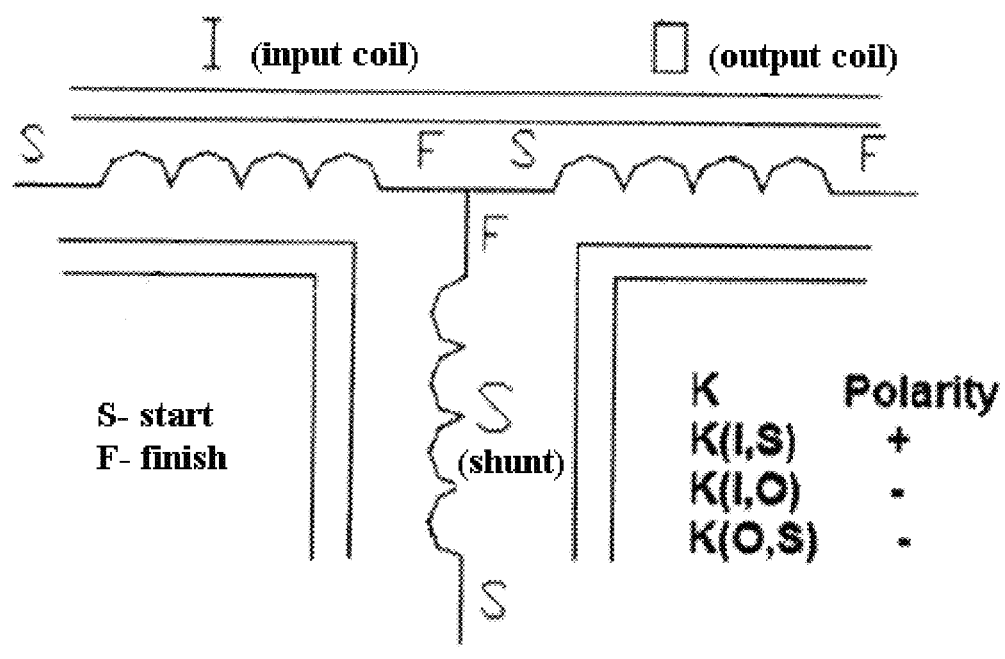
FIG. 23 illustrates certain features of some embodiments of the present invention.

In some embodiments, the instant invention can be utilized on a single phase filter having a three phase core. In some embodiments, the instant invention can be applied to a single phase filter shown in FIG. 23. For example, the filter of FIG. 23 can further include, for example, FAPs alone, FAPs with MAPs, FAPs with insulation gap piece(s), or FAPs with MAPs and with insulation gap piece(s) in accordance with the discussed principles of the instant invention.

Figure 24:
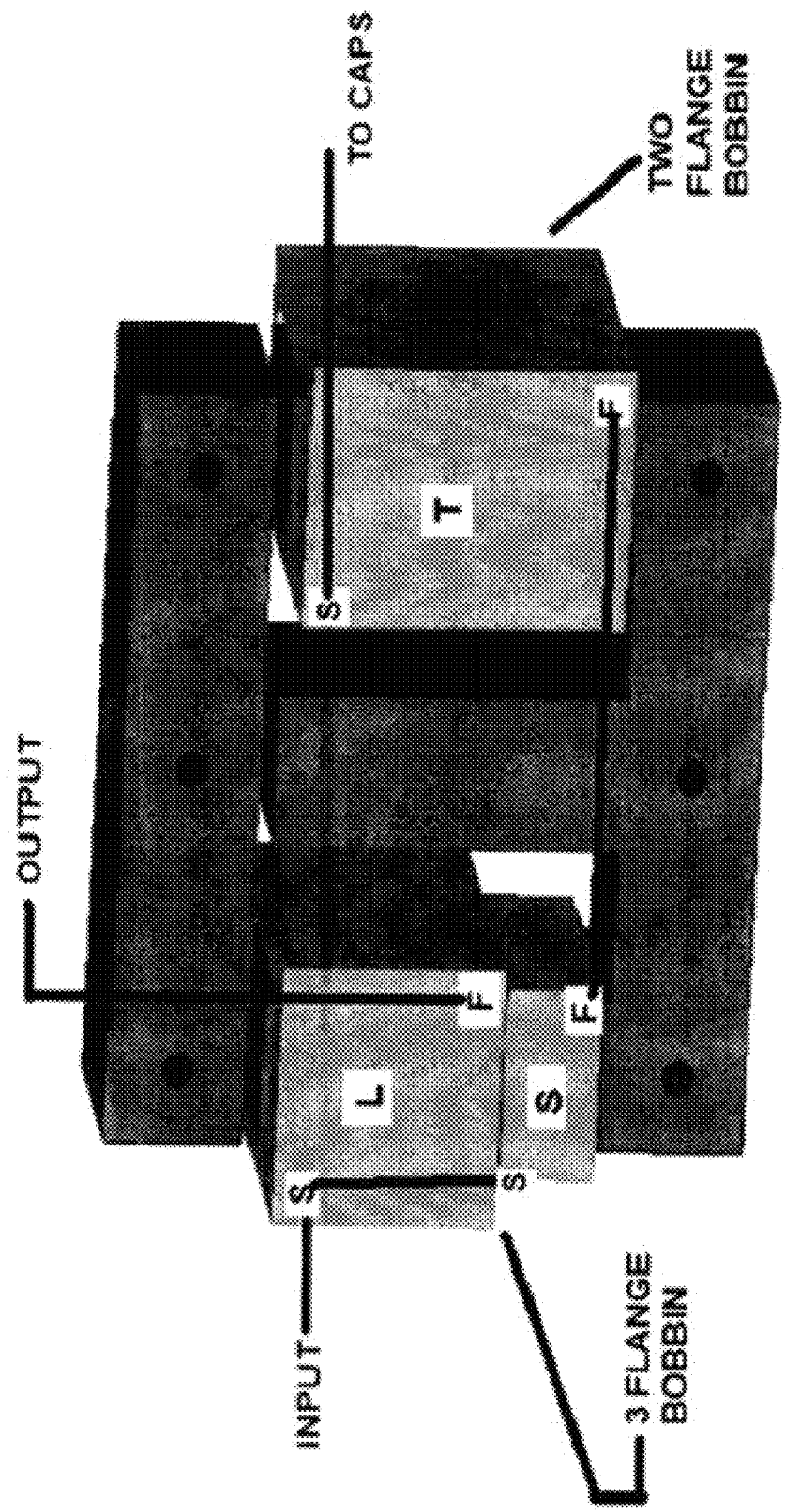
FIG. 24 illustrates certain features of some embodiments of the present invention.
Figure 25:
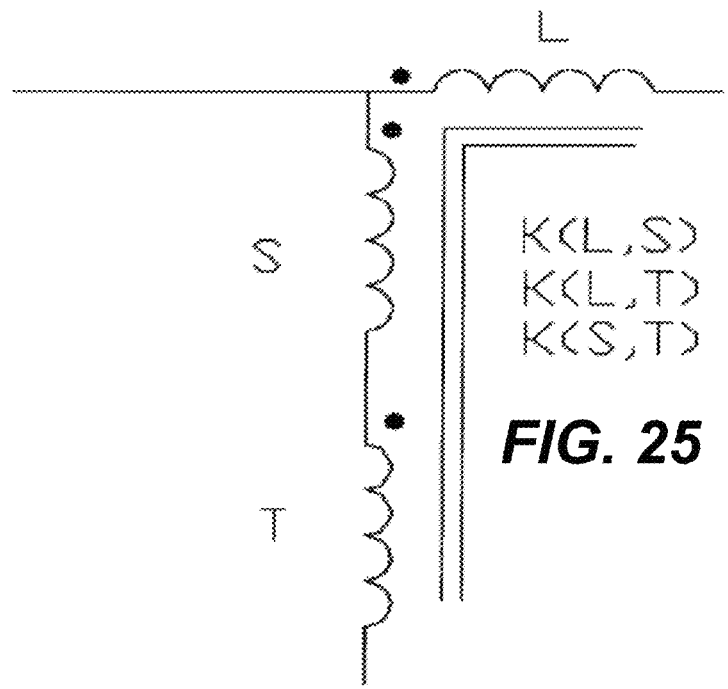
FIG. 25 illustrates certain features of some embodiments of the present invention.

In some embodiments, the instant invention can be applied to a single phase filter of a split shunt coil having construction shown in FIGS. 24-25. In some embodiments, the single phase filter utilized by the instant invention can be constructed in accordance with U.S. Pat. No. 7,535,125, entitled "SINGLE PHASE FILTER FOR REDUCING HARMONICS," whose disclosure in its entirety is incorporated herein for all purposes and specifically for the construction of the single phase filters. For example, the single phase filter utilized by the instant invention can be constructed in accordance with U.S. Pat. No. 7,535,125 to a power system connector for connection to a source of electrical power; a load connector for connection to a load powered by the source of electrical power; a core of a magnetically permeable material; a first line winding having a first end directly connected to the power system connector and a second end coupled to the load connector, the first line winding wound around the core in an orientation that produces magnetic flux having a first polarity; a first shunt winding wound around the core in an orientation that produces magnetic flux having a second polarity opposite to the first polarity; and a capacitor connected in series between the first shunt winding and an essentially electrically common point at which both the source of electrical power and the load meet; where the core can includes: a first core bridge; a second core bridge spaced apart from the first core bridge; and three legs extending between the first core bridge and the second core bridge, and where the first line winding is wound around one of the legs and the first shunt winding is wound around another one of the legs.

For example, the filter of FIGS. 24-25 can further include FAPs alone, FAPs with MAPs, FAPs with insulation gap piece(s), or FAPs with MAPs and with insulation gap piece(s) in accordance with the discussed principles of the instant invention.

Example 3

Harmonic Filters with a Multi-Section Core

In some embodiments, as shown, for example, in FIGS. 2A-2B and 4A-4B, the instant invention can provide devices that at least include harmonic current filters having inductors with a common core that can be divided into at least two sections.

Example 4

Adaptive Passive Integrated DC Link Choke

In some embodiments, the instant invention can provide devices based on an integrated DC link choke. In some embodiments, the integrated DC link chokes can include a magnetic core with an inner leg and two outer legs, and at least two coils which may be connected in DC current paths in the motor drive. In some embodiments, each coil with respect to each other contains both common-mode and differential mode inductances.

Figure 28:
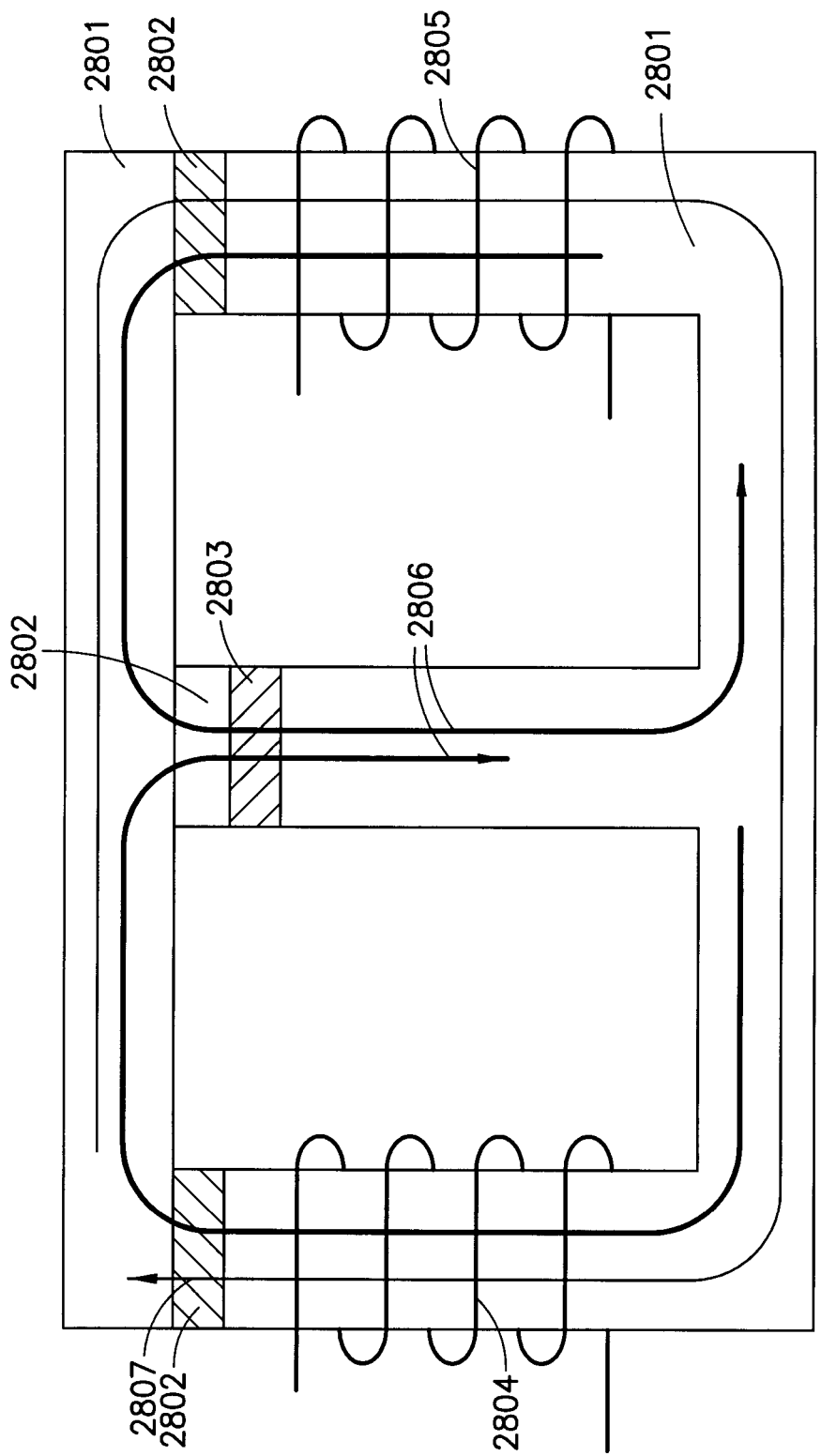
FIG. 28 illustrates certain features of some embodiments of the present invention.
Figure 29:
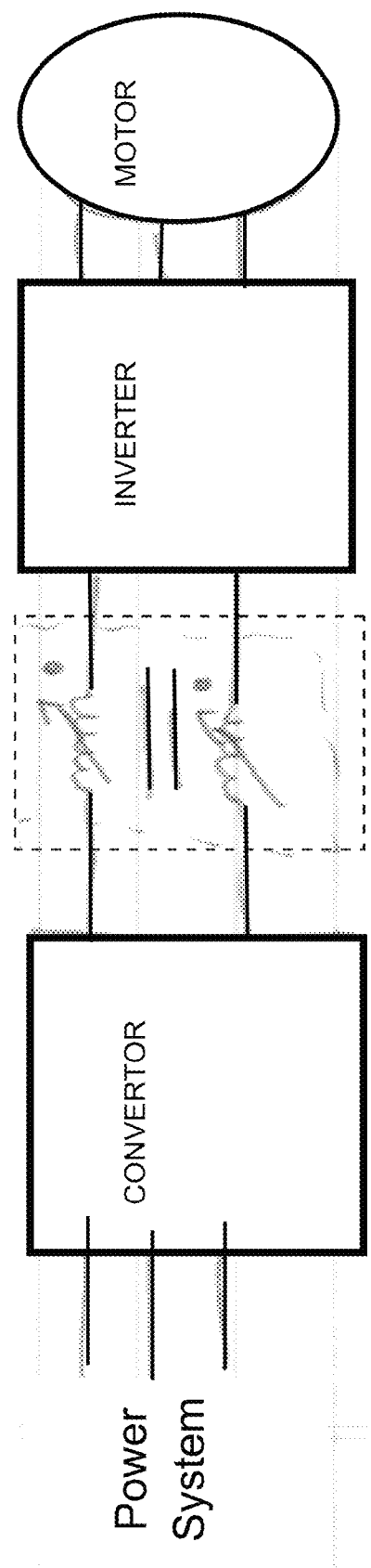
FIG. 29 illustrates certain features of some embodiments of the present invention.

In some embodiments, FIG. 28 shows an exemplary design of the instant invention based on the integrated DC link choke. In some embodiments, the core is made of laminations 2801. In some embodiments, the exemplary design further includes the FAPs structure 2803 in the center. In some embodiments, the exemplary design further includes a gap piece 2802 of an insulation material like Nomex. In some embodiments, a differential mode flux path indicated by lines 2806 goes through the center leg. In some embodiments, a common mode flux path, indicated by the arrow 2807, goes through the outside of the core. In some embodiments, since the differential mode flux path 2806 is through the center of the core where the FAPs 2803 are located, the differential mode inductance would increase at light loads and decrease to near rated inductance at full load. In some embodiments, a Curie temperature of FAPs in this case may not be required because the elevated differential mode inductance can be beneficial. In some embodiments, the increased differential mode inductance at reduced load can more effectively smooth the DC current on a DC bus. In some embodiments, the common-mode inductance can suppress common mode voltages in the motor drive. FIG. 29 is a block diagram of a typical adjustable speed drive, with coil magnetic polarities shown, for which the integrated DC link choke of the instant invention can be used.

In some embodiments, the applications of the instant invention based on integrated DC link choke can result in at least one of the following benefits:

1) Reduce AC input line harmonics,
2) Help meet IEEE-519 limits,
3) Absorb voltage/current spikes,
4) Reduce AC ripple on DC bus,
5) Reduce dv/dt and di/dt rates,
6) Solve nuisance over-voltage tripping, and
7) Reduce DC Bus transient over-voltage.

In some embodiments, when added between the input rectifier and bus capacitor, the link choke of the instant invention can improve the DC bus waveform and the AC input waveform by reducing the amount of AC ripple on the DC bus, reducing the AC input line harmonics and/or offering protection against nuisance tripping due to voltage spikes such as those caused by capacitor switching. In some embodiments, the link choke of the instant invention can offer the advantage of maximizing the circuit inductance for power quality reasons, but without causing an AC input line voltage drop. In some embodiments, the link choke of the instant invention can be used individually, typically on the positive DC bus, or in pairs with one each on both the positive and negative bus.

In some embodiments, the link choke of the instant invention can be combined with an AC input reactor.

Example 5

Adaptive Passive Three (3) Phase AC Drive Input or Output Reactor

Figures 35, 36:
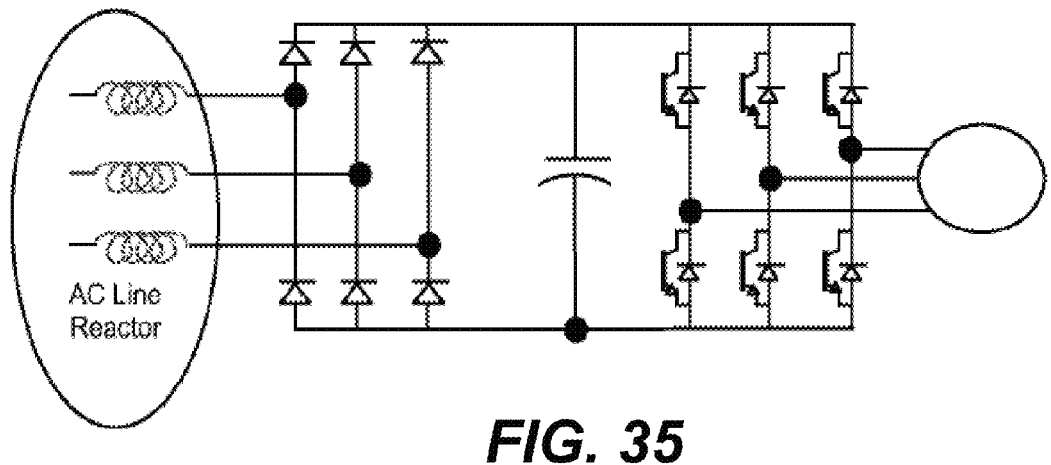
FIG. 35 illustrates certain features of some embodiments of the present invention.
FIG. 36 illustrates certain features of some embodiments of the present invention.
Figure 37A:
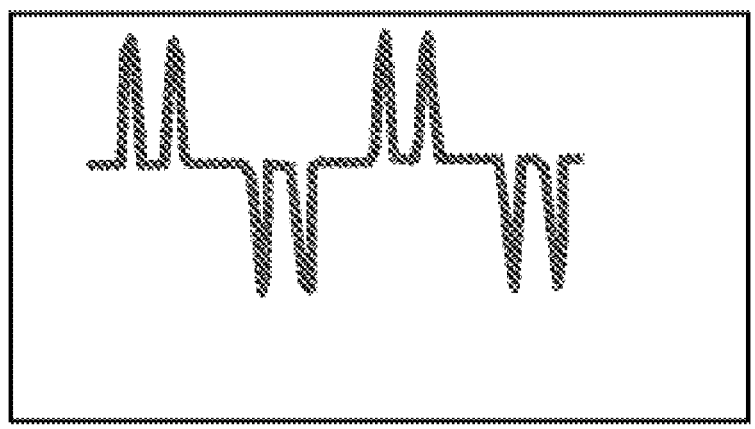
FIGS. 37A-37B illustrate certain features of some embodiments of the present invention.
Figure 37B:
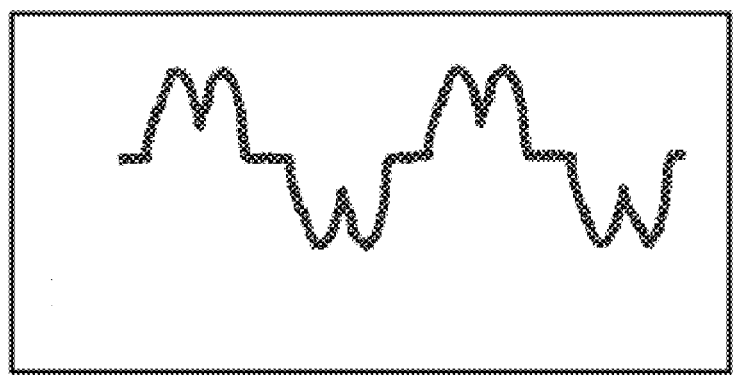

In some embodiments, AC line reactors are used for increasing the source impedance relative to an individual load. In some embodiments, line reactors can be connected in series with the six pulse rectifier diodes at the input to the VFD (variable frequency drives), as shown in FIG. 35. In some embodiments, harmonic spectrum data for a six pulse VFD load fed by a power supply with an effective source reactance of 3%, 5% and 8% can look as shown in FIG. 36. These data represent the harmonics measured at the input to the six pulse rectifier and will reduce to lower percentages when measured further upstream, provided there are other linear loads operating on the system. If 20% of the system load is comprised of VFDs with 5% input impedance, and 80% has linear loads, the harmonic current distortion at the VFD input will be 35% THID, but only 7% at the supply transformer secondary. In some embodiments, line reactors are the most economical means of reducing harmonics. In some embodiments, line reactors can achieve practical ratings of at least 29% to 44% THID at the input to the six pulse rectifier (usually lower THID at the transformer secondary), at full load operation. In some embodiments, watts losses are less than 1% of the load. FIGS. 37A-B illustrate the input current waveforms of a six pulse rectifier supplied by a power source of (a) 0.5% effective impedance (FIG. 37A) and (b) 3% effective impedance (FIG. 37B).

Figure 38:
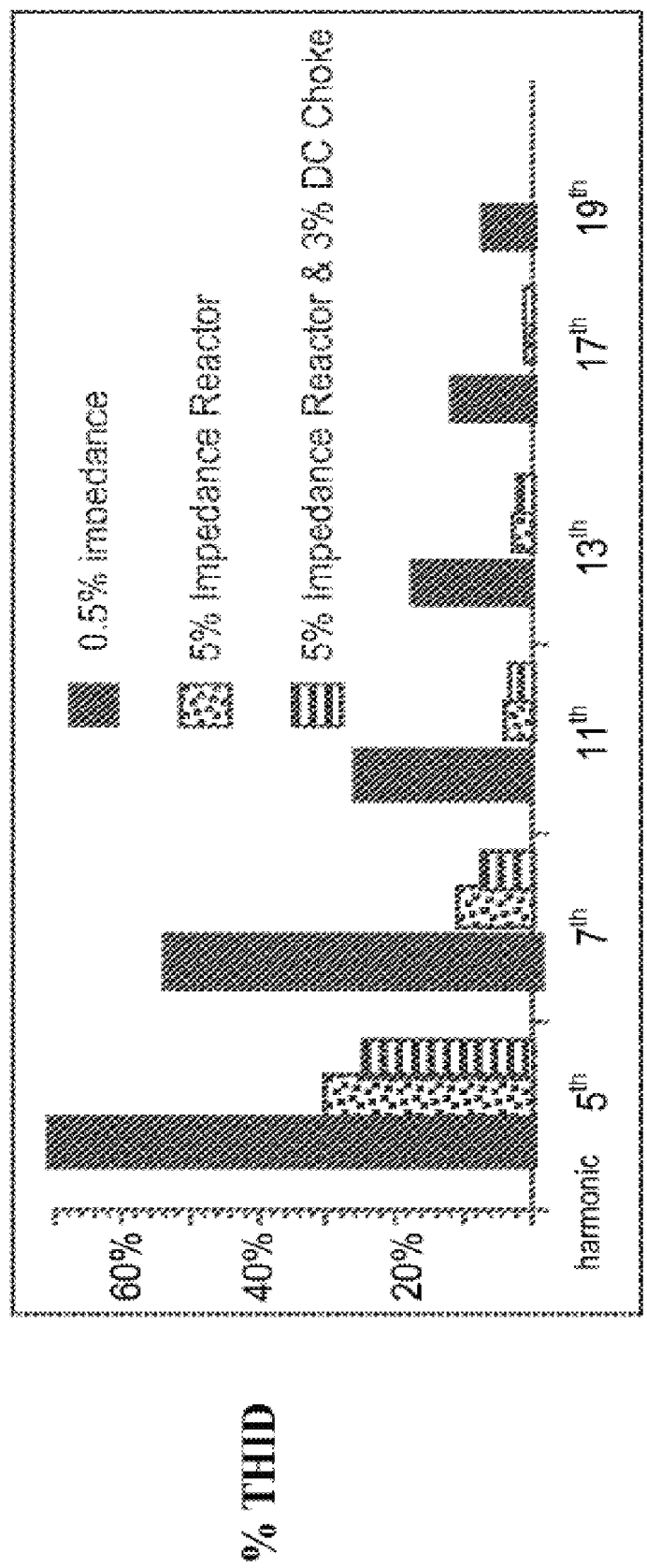
FIG. 38 illustrates certain features of some embodiments of the present invention.

FIG. 38 illustrates the harmonic spectrum for a six-pulse rectifier with 0.5%, 5% or 8% effective source impedance, (8%=5% line reactor+3% DC bus choke). In some embodiments, the harmonic mitigation performance of reactors varies with load because their effective impedance reduces proportionately as the current through them is decreased. In some embodiments, at full load, a 5% effective impedance reactor achieves harmonic distortion of 35% THID, however, at 60% load its effective impedance is only 3% {0.6×5%=3%}, and harmonics will be 44% THID. In some embodiments, although THID increased as a percentage, the total rms magnitude of harmonic current actually decreased by nearly 25% {1−((0.6×44%)/35%)=24.5%}. In some embodiments, since voltage distortion at the transformer secondary is dependent upon the magnitude and frequency of current harmonics that cause harmonic voltage drops across the transformer's internal reactance, the voltage distortion (THVD), at the transformer secondary, actually decreases as this load is reduced.

Figure 30:
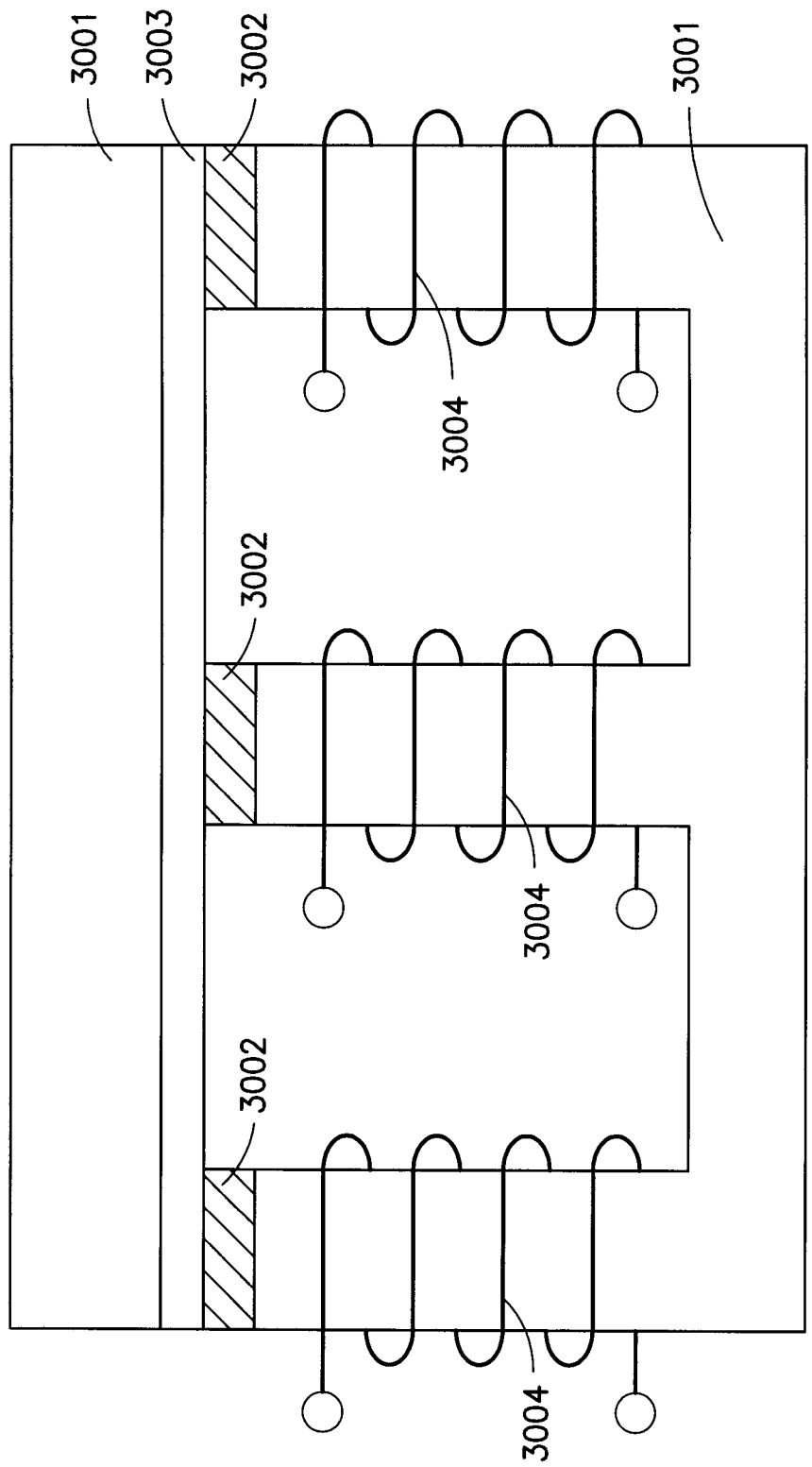
FIG. 30 illustrates certain features of some embodiments of the present invention.

In some embodiments, FIG. 30 shows an exemplary design of the instant invention based on an "EI" core adaptive passive three (3) phase reactor. In some embodiments, the exemplary design includes a core made of laminations 3001 and three windings 3004. In some embodiments, the exemplary design further includes the FAPs structures 3002. In some embodiments, the exemplary design further includes a gap piece 3003 of an insulation material like Nomex. In some embodiments, the exemplary design may not need MAPs because an elevated or nonlinear inductance would not be concern at full load operation.

Figure 31:
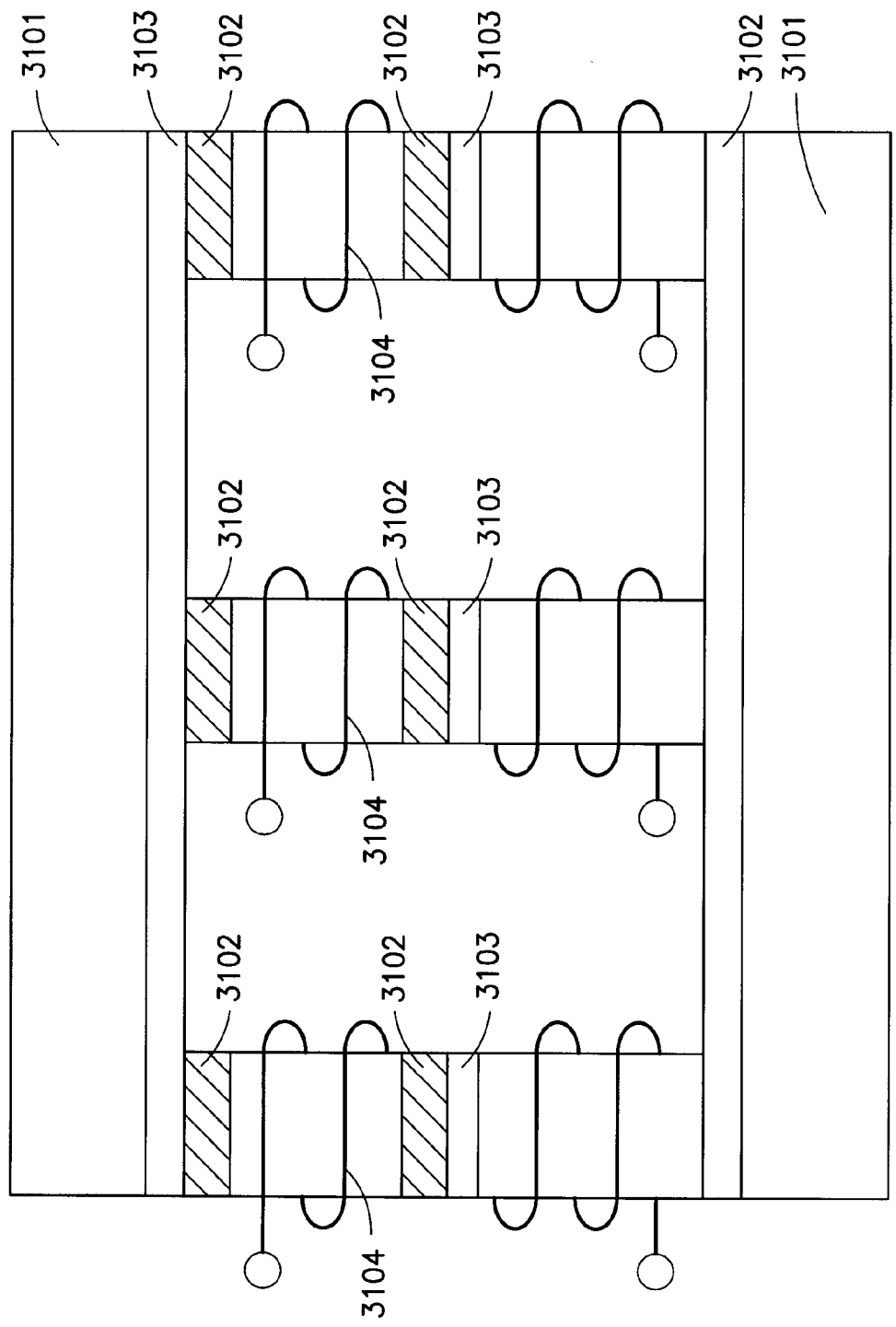
FIG. 31 illustrates certain features of some embodiments of the present invention.

In some embodiments, FIG. 31 shows another exemplary design of the instant invention based on an "EI" core adaptive passive three (3) phase reactor. In some embodiments, the exemplary design includes a core made of laminations 3101 and three windings 3104. In some embodiments, the exemplary design further includes the FAPs structures 3102. In some embodiments, the exemplary design further includes a gap piece 3103 of an insulation material like Nomex. In some embodiments, as shown in FIGS. 30-31, the FAPs and/or insulator gaps can be located anywhere throughout the length of each leg. This exemplary location principle of the instant invention can apply to any embodiment and/or exemplary application described herein.

Figure 32:
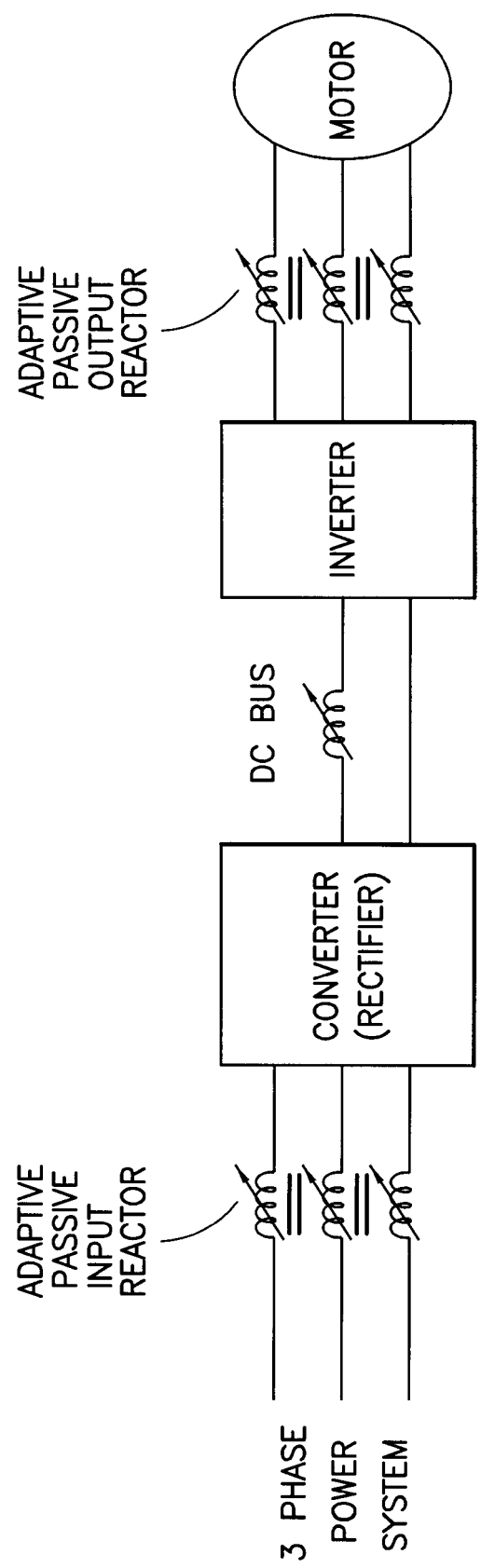
FIG. 32 illustrates certain features of some embodiments of the present invention.

In some embodiments, using one of the exemplary design of the instant invention based on the adaptive passive three (3) phase reactor, on the input of a drive with a rectifier front end, the harmonic current distortion is reduced because of the increased impedance at reduced loads. In some embodiments, using one of the exemplary design of the instant invention based on the adaptive passive three (3) phase reactor, on the output of a drive, the current distortion of the PWM waveform going to the motor is also reduced. FIG. 32 is a block diagram of components in an exemplary adjustable speed motor drive application of the instant invention.

In some embodiments, the instant invention based on the adaptive passive three (3) phase reactor can absorb many of the power line disturbances which otherwise damage or shut down inverters, variable frequency drives (VFDs), variable speed controllers, or other sensitive equipment. In some embodiments, the instant invention based on the adaptive passive three (3) phase reactor can present a robust filtering solution for a 6 pulse rectifier or power conversion unit. In some embodiments, the instant invention based on the adaptive passive three (3) phase reactor can be applied up to 690 VAC with compatible impedance ratings. In some embodiments, the instant invention based on the adaptive passive three (3) phase reactor can be suitable for use on either the drive input or drive output. In some embodiments, the instant invention based on the adaptive passive three (3) phase reactor can carry full rated fundamental current and also handle current and frequencies associated with harmonics up to 50% over the fundamental, allowing to be used on the output of variable frequency drives including IGBT types with switching frequencies up to 20 kHz. In some embodiments, the instant invention based on the adaptive passive three (3) phase reactor can be applied to single phase drives to provide transient protection as well.

Example 6

Figure 33:
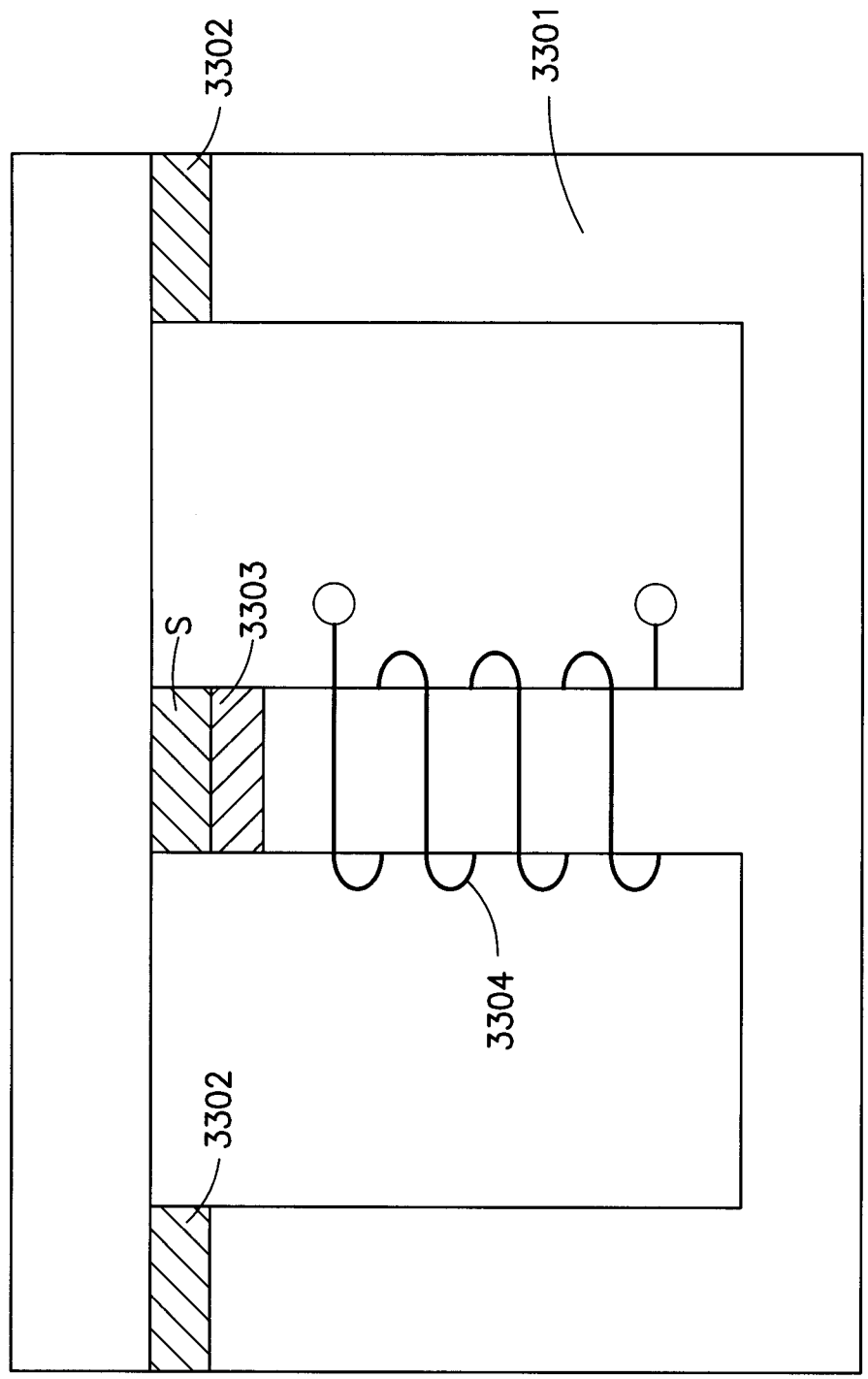
FIG. 33 illustrates certain features of some embodiments of the present invention.

Adaptive Passive Single Phase AC Drive Input Reactor, Adaptive Passive Single Phase AC Drive Output Reactor, and Adaptive Passive Single Phase DC Reactor In some embodiments, FIG. 33 shows an exemplary design of the instant invention based on an "EI" core adaptive passive single phase reactor. In some embodiments, the exemplary design includes a core made of laminations 3301 and the windings 3304. In some embodiments, the exemplary design further includes the FAPs structures 3303. In some embodiments, the exemplary design further includes gap pieces 3302 of an insulation material like Nomex. In some embodiments, the exemplary design may not need MAPs because an elevated or nonlinear inductance would not be concern at full load operation.

Figure 34:
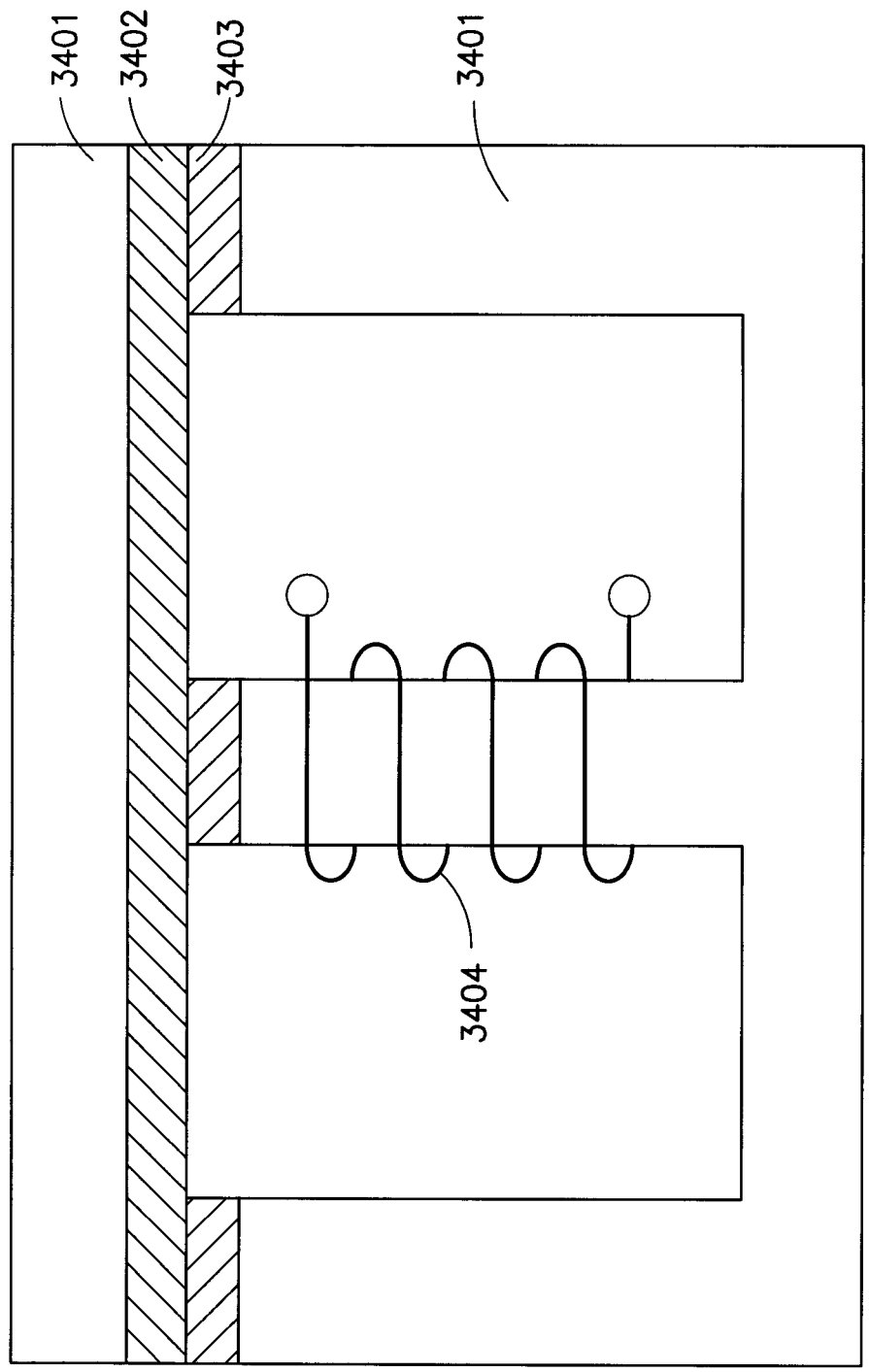
FIG. 34 illustrates certain features of some embodiments of the present invention.

In some embodiments, FIG. 34 shows another exemplary design of the instant invention based on the "EI" core adaptive passive single phase reactor. In some embodiments, the exemplary design includes a core made of laminations 3401 and the windings 3404. In some embodiments, the exemplary design further includes the FAPs structures 3403. In some embodiments, the exemplary design further includes gap pieces 3402 of an insulation material like Nomex. In some embodiments, the exemplary design may not need MAPs because an elevated or nonlinear inductance would not be concern at full load operation. In some embodiments, as shown in FIGS. 33-34, the FAPs and/or insulator gaps can be located differently to get similar performance. This exemplary location principle of the instant invention can apply to any embodiment and/or exemplary application described herein.

In some embodiments, using one of the exemplary design of the instant invention based on the adaptive passive single phase reactor, on the input of a drive with a rectifier front end, the harmonic current distortion is reduced because of the increased impedance at reduced loads. In some embodiments, using one of the exemplary design of the instant invention based on the adaptive passive single phase reactor, on the output of a drive the adaptive passive single phase reactor, the current distortion of the PWM waveform going to the motor is reduced as well. In some embodiments, using one of the exemplary designs of the instant invention based on the adaptive passive single phase reactor on the DC bus reduces ripple at reduced loads.

When applied to DC reactors, some embodiments can achieve lower THID at light loads.

In some embodiments, the instant invention can provide an inductor that at least includes the following component(s): at least one FAP positioned along at least one magnetic flux path; where the at least one FAP is a high permeability core gap piece; and where the at least one FAP has an effective magnetic permeability that varies based on at least in part on one of the following factors: i) at least one magnetic flux through the at least one FAP, and ii) sufficient heating of the at least one FAP.

In some embodiments, where the sufficient heating is to Curie temperature of the at least one FAP.

In some embodiments, where the inductor further comprises at least one MAP, wherein the at least one MAP is a metallic gap piece, wherein the at least one MAP is located in sufficient proximity to the at least one FAP hereby resulting in the sufficient heating by at least one MAP of the at least one FAP.

In some embodiments, where the inductor further comprises at least one insulator, wherein the at least one insulator is positioned along the at least one magnetic flux part hereby further adjusting an inductance of the inductor.

In some embodiments, where the at least one FAP comprises at least one ferrite material.

In some embodiments, where the at least one soft ferrite material is selected from a group consisted of Nickel-Zinc ferrite material, Magnesium-Zinc ferrite material, and Manganese-Zinc ferrite material.

In some embodiments, where the at least one FAP comprises at least one material having suitable relative permeability in a range between 14 to 550.

In some embodiments, where the at least one FAP comprises at least one molypermalloy power material.

In some embodiments, where the at least one molypermalloy power material contains at least 50 percent weight of Nickel, at least 20 percent weight of Iron, and the balance comprising another suitable material.

In some embodiments, where the Curie temperature is between about 130 and about 1200 degrees Celsius.

In some embodiments, where the Curie temperature is about 200 degrees Celsius.

In some embodiments, where the at least one FAP comprises at least one first FAP part and at least one second FAP part wherein the at least one first FAP part and the at least one second FAP part are separate structures.

In some embodiments, where the at least one first FAP part differs from the at least one second FAP part in at least one of the followings characteristics: composition, size, and shape.

In some embodiments, where the at least one first FAP part has a first shape and the at least one second FAP part has a second shape, and wherein the first shape is complementary to the second shape such that the at least one first FAP part interlocks with the at least one second FAP part to assemble the at least one FAP.

In some embodiments, where the inductor is one of the following devices: i) a passive three phase filter, ii) a passive single phase filter, iii) a harmonic filter, iv) an integrated DC link, choke, v) a three phase AC drive reactor, vi) a single phase AC drive reactor, and vii) a single phase DC reactor.

In some embodiments, where a core of the harmonic filter has a plurality of sections.

In some embodiments, where three phase AC drive reactor is a three phase AC drive input reactor.

In some embodiments, where the single phase AC drive reactor is a single phase AC drive input reactor.

While a number of embodiments of the present invention have been described, it is understood that these embodiments are illustrative only, and not restrictive, and that many modifications may become apparent to those of ordinary skill in the art.

What is claimed is:

1. An inductor, comprising:
   at least one high permeability core gap piece positioned within a core of the inductor such that at least one magnetic flux path of the core of the inductor passes through the at least one high permeability core gap piece;
   wherein the at least one high permeability core gap piece has an effective magnetic permeability that is at least 1000 times greater than a permeability of air and varies so as to result in the at least one high permeability core gap piece is capable of affecting an inductance of the inductor based on, at least in part, on the effective magnetic permeability of the at least one high permeability core gap piece, wherein the effective magnetic permeability changes based, at least in part, on the following factors:
   i) at least one magnetic flux, and
   ii) sufficient heating of the at least one high permeability core gap piece.

2. The inductor of claim 1, wherein the sufficient heating is to a Curie temperature of the at least one high permeability core gap piece.

3. The inductor of claim 2, wherein the inductor further comprises at least one metallic gap piece, wherein the at least one metallic gap piece is located:
   i) within the core of the inductor such that the at least one magnetic flux passes through the at least one metallic gap piece, and
   ii) in sufficient proximity to the at least one high permeability core gap piece,
   wherein the at least one metallic gap piece is capable of being heated when the at least one magnetic flux passes through the at least one metallic gap piece; and
   wherein the at least one metallic gap piece is capable of causing, when being heated, the sufficient heating of the at least one high permeability core gap piece.

4. The inductor of claim 3, wherein the inductor further comprises at least one insulator, wherein the at least one insulator is:
   i) a low permeability non-metallic core gap piece,
   ii) positioned within the core of the inductor such that the at least one magnetic flux of the core of the inductor passes through the at least one insulator, and
   iii) is capable of affecting an inductance of the inductor.

5. The inductor of claim 1, wherein the at least one high permeability core gap piece comprises at least one soft ferrite material.

6. The inductor of claim 5, wherein the at least one soft ferrite material is selected from a group consisted of Nickel-Zinc ferrite material, Magnesium-Zinc ferrite material, and Manganese-Zinc ferrite material.

7. The inductor of claim 1, wherein the at least one high permeability core gap piece comprises at least one material having suitable relative permeability in a range between 14 to 550.

8. The inductor of claim 1, wherein the at least one high permeability core gap piece comprises at least one molypermalloy power material.

9. The inductor of claim 8, wherein the at least one molypermalloy power material contains at least 50 percent weight of Nickel, at least 20 percent weight of Iron, and the balance comprising another suitable material.

10. The inductor of claim 2, wherein the Curie temperature is between about 130 and about 1200 degrees Celsius.

11. The inductor of claim 6, wherein the Curie temperature is about 200 degrees Celsius.

12. The inductor of claim 1, wherein the at least one FAP comprises at least one first FAP part and at least one second FAP part wherein the at least one first FAP part and the at least one second FAP part are separate structures.

13. The inductor of claim 12, wherein the at least one first FAP part differs from the at least one second FAP part in at least one of the followings characteristics: composition, size, and shape.

14. The inductor of claim 13, wherein the at least one first FAP part has a first shape and the at least one second FAP part has a second shape, and wherein the first shape is complementary to the second shape such that the at least one first FAP part interlocks with the at least one second FAP part to assemble the at least one FAP.

* * * * *